(12) United States Patent
Rastrow et al.

(10) Patent No.: US 11,676,575 B2
(45) Date of Patent: *Jun. 13, 2023

(54) ON-DEVICE LEARNING IN A HYBRID SPEECH PROCESSING SYSTEM

(71) Applicant: Amazon Technologies, Inc., Seattle, WA (US)

(72) Inventors: Ariya Rastrow, Seattle, WA (US); Rohit Prasad, Lexington, MA (US); Nikko Strom, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/386,078

(22) Filed: Jul. 27, 2021

(65) Prior Publication Data

US 2022/0020357 A1 Jan. 20, 2022

Related U.S. Application Data

(63) Continuation of application No. 16/189,303, filed on Nov. 13, 2018, now Pat. No. 11,087,739.

(51) Int. Cl.
*G10L 15/06* (2013.01)
*G10L 15/30* (2013.01)
*G10L 15/18* (2013.01)

(52) U.S. Cl.
CPC ............ *G10L 15/063* (2013.01); *G10L 15/18* (2013.01); *G10L 15/30* (2013.01); *G10L 2015/0635* (2013.01)

(58) Field of Classification Search
CPC ....... G10L 15/063; G10L 15/18; G10L 15/30; G10L 2015/0635
See application file for complete search history.

(56) References Cited

U.S. PATENT DOCUMENTS

| | | | | |
|---|---|---|---|---|
| 6,134,527 A | * | 10/2000 | Meunier | ............... G10L 15/187 704/E15.02 |
| 2002/0116196 A1 | * | 8/2002 | Tran | ....................... G06F 1/3203 704/E15.045 |
| 2003/0120493 A1 | * | 6/2003 | Gupta | .................... G10L 15/063 704/E15.044 |
| 2008/0103771 A1 | * | 5/2008 | Jouvet | ..................... G10L 15/30 704/E15.047 |
| 2015/0371628 A1 | * | 12/2015 | Kreifeldt | ................. G10L 15/22 704/254 |

\* cited by examiner

*Primary Examiner* — Sonia L Gay
(74) *Attorney, Agent, or Firm* — Pierce Atwood LLP

(57) ABSTRACT

A speech interface device is configured to receive response data from a remote speech processing system for responding to user speech. This response data may be enhanced with information such as remote NLU data. The response data from the remote speech processing system may be compared to local NLU data to improve a speech processing model on the device. Thus, the device may perform supervised on-device learning based on the remote NLU data. The device may determine differences between the updated speech processing model and an original speech processing model received from the remote system and may send data indicating these differences to the remote system. The remote system may aggregate data received from a plurality of devices and may generate an improved speech processing model.

20 Claims, 22 Drawing Sheets

ON-DEVICE LEARNING IN A HYBRID SPEECH PROCESSING SYSTEM

CROSS-REFERENCE TO RELATED APPLICATION

This application is a continuation of, and claims the benefit of priority of, U.S. Non-Provisional patent application Ser. No. 16/189,303, filed Nov. 13, 2018, and entitled "ON-DEVICE LEARNING IN A HYBRID SPEECH PROCESSING SYSTEM," in the names of Ariya Rastrow, et al., which is scheduled to issue as U.S. Pat. No. 11,087,739, the contents of which are expressly incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
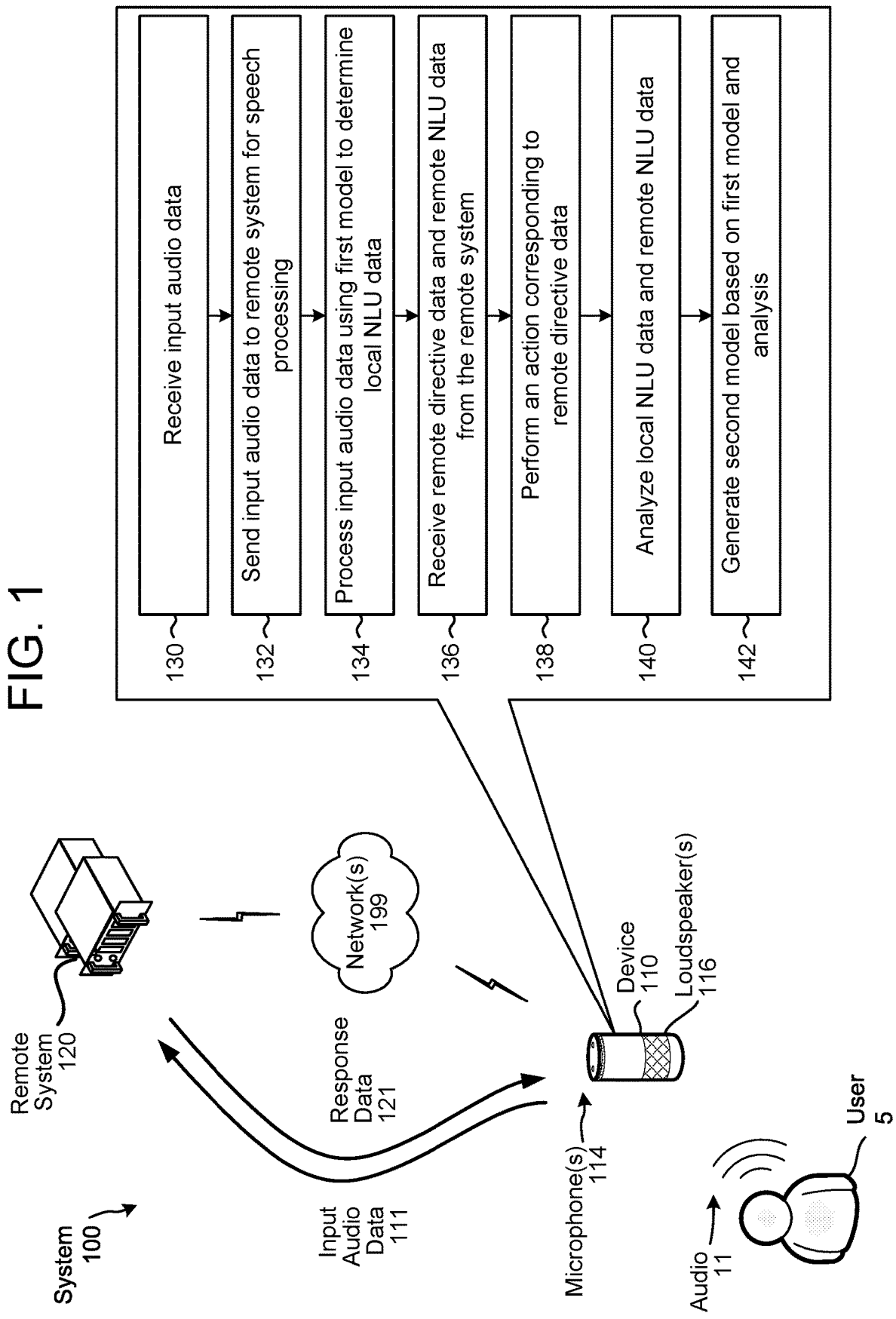
FIG. 1 illustrates a system configured to perform speech processing using a hybrid speech processing system according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may answer user commands requesting the output of content. For example, a user may say "Alexa, what is the weather." In response, the system may output weather information. For further example, a user may say "Alexa, play Adele." In response, the system may output music sang by Adele.

A generalized speech processing system may be configured to perform many different actions such as outputting media, controlling home devices, making reservations, ordering products, obtaining reviews, playing games, etc. It is a non-trivial task to configure a system to accurately capture audio data for general utterances, be able to process the audio data to determine the user's intent, identify an appropriate executable action for that intent, and select the appropriate component for handling that action to ultimately correctly execute the user's intent and obtain the desired result.

Certain speech processing systems perform NLU to derive a list of intents that potentially relate to an input user command. An intent corresponds to what the user desires a system to do in response to the utterance. During NLU processing the system processes the text of the user command to determine one or more intents that may correspond to the user utterance. The intent may be represented by a particular action that the system (either alone or in conjunction with other components) can perform. For example, a system may determine an input command of "Play Adele"

potentially relates to a <PlayMusic> action and a <PlayVideo> action, since the command may correspond to a request to play Adele music or a request to play an Adele music video.

Speech processing can be computationally expensive. That is, significant computing resources may be needed to process ASR, NLU, and command execution within a reasonable time frame. Because of this, a distributed computing environment may be used when performing speech processing. A typical distributed environment may involve a local device having one or more microphones configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

In some examples, a local device may be capable of limited speech processing. For example, the local device may perform speech processing using a local speech processing component to determine a command. Thus, the local device may process voice commands even when the local device is not connected to the remote system. In a hybrid implementation, the local device may improve performance and/or decrease latency by sending the audio data to the remote system while simultaneously processing the audio data locally. For example, if the local device receives a remote command from the remote system within a specified period of time, the local device may perform an action corresponding to the remote command. However, if the local device does not receive the remote command within the specified period of time, the local device may determine a local command and perform a second action corresponding to the local command.

To improve processing on the local device, devices, systems and methods are disclosed that perform on-device learning by comparing local NLU data to remote NLU data to improve a speech processing model. Thus, a device may perform supervised on-device learning based on the remote NLU data. The device may determine differences between the updated speech processing model and an original speech processing model received from the remote system and may send data indicating these differences to the remote system. The remote system may aggregate data received from a plurality of devices and may generate an improved speech processing model.

As illustrated in FIG. 1, disclosed is a system 100 for processing commands in a distributed system according to embodiments of the present disclosure. Although the figures and discussion illustrate certain operational steps of the system in a particular order, the steps described may be performed in a different order (as well as certain steps removed or added) without departing from the intent of the disclosure. A device 110 local to a user 5, one or more server(s) included in remote system 120, and one or more skill server(s) 125 may communicate across one or more networks 199. The skill server(s) 125 may each correspond to a particular skill 290 (described below) and may be capable of performing operations to ultimately execute an action.

To detect user speech or other audio, the device 110 may use one or more microphones(s) 114 to generate input audio data that captures audio in a room (e.g., an environment) in which the device 110 is located. For example, if the device 110 are located within earshot of a user 5, the device 110 may capture audio data representing speech generated by the user 5. As is known and as used herein, "capturing" an audio signal includes a microphone transducing audio waves (e.g., sound waves) of captured sound to an electrical signal and a codec digitizing the signal to generate the microphone audio data.

The device 110 may process voice commands received from the user 5, enabling the user 5 to control the devices 110 and/or other devices associated with a user profile corresponding to the user 5. For example, the device 110 may include a wakeword engine that processing the input audio data to detect a representation of a wakeword. When a wakeword is detected in the input audio data, the device 110 may generate input audio data 111 corresponding to the wakeword and send the input audio data 111 to the remote system 120 for speech processing. The remote system 120 may process the input audio data 111, determine the voice command, and perform one or more actions based on the voice command. For example, the remote system 120 may generate a command instructing the device 110 (or any other device) to perform an action, may generate output audio data corresponding to the action, may send response data (including the output audio data and/or the command) to the device 110, and the device 110 may perform an action.

As illustrated in FIG. 1, the device 110 may receive (130) input audio data, may send (132) the input audio data to a remote system 120 for speech processing (e.g., remote processing), and may process (134) the input audio data using a first model to determine local NLU data (e.g., local processing). The device 110 may receive (136) remote directive data and remote NLU data from the remote system 120 (e.g., response data) and may perform (138) an action corresponding to the remote directive data, as will be described in greater detail below with regard to FIG. 7.

To improve the local processing, the device 110 may analyze (140) the local NLU data and the remote NLU data and may generate (142) a second model based on the first model and the analysis, as will be described in greater detail below with regard to FIGS. 10A-12.

Figure 2:
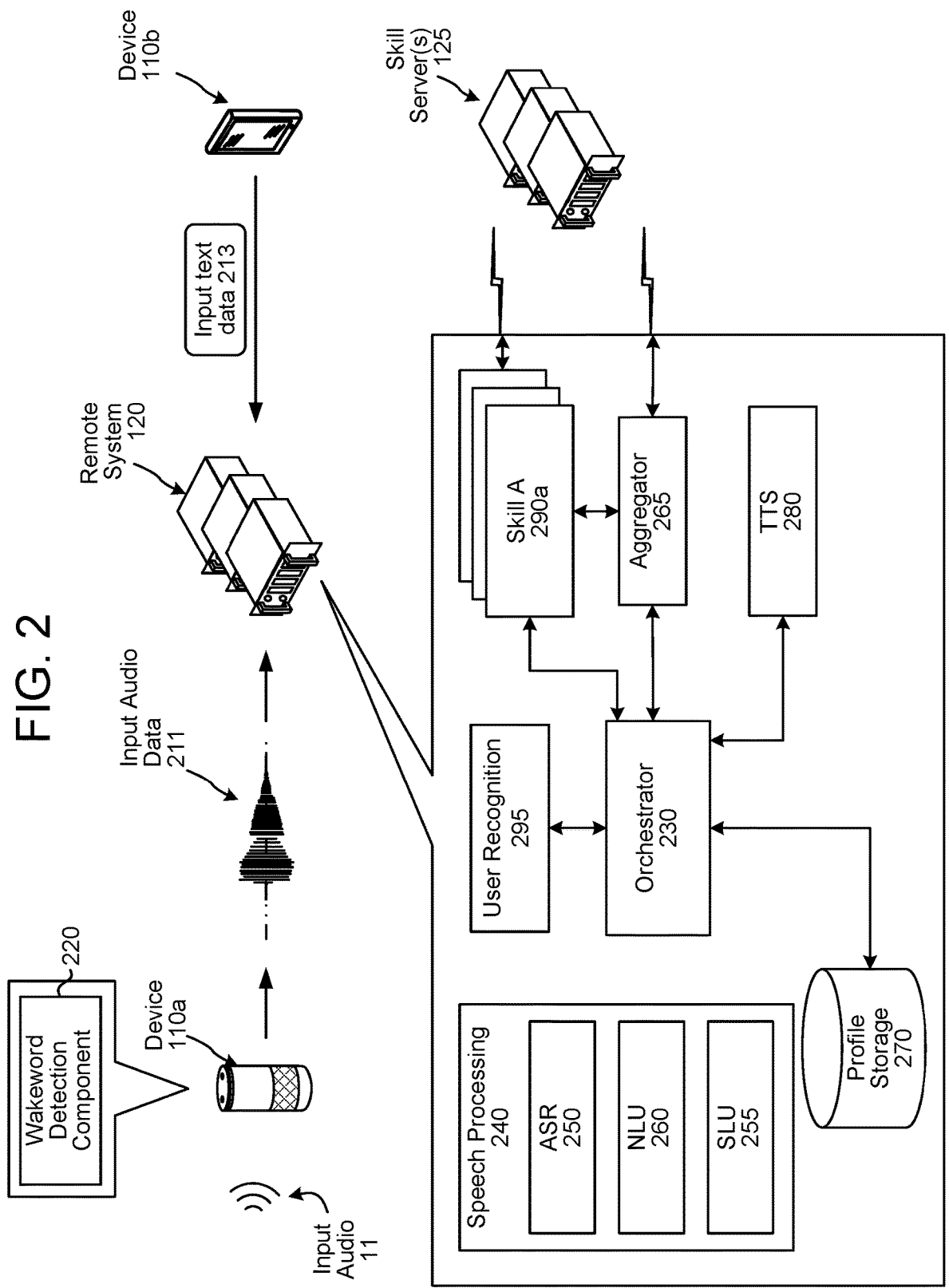
FIG. 2 is a conceptual diagram of components of a system according to embodiments of the present disclosure.

The system may operate using various components as described in FIG. 2. The various components may be located on a same or different physical devices. Communication between various components may occur directly or across a network(s) 199.

During a runtime operation (such as when a user utterance/command is received by the system), a device 110 may detect input audio 11 corresponding to a spoken utterance originating from the user 5. The device 110 generates input audio data 211 corresponding to the input audio 11 and sends the input audio data 211 to the remote system 120. The remote system 120 receives the input audio data 211 from the device 110 and performs speech processing (such as ASR and NLU) on the input audio data to determine that the utterance includes a go-back request.

Alternatively, a device may receive input from the user 5 corresponding to text or a button press via a touch screen providing a virtual keyboard. The device may generate input text data corresponding to the input text. The device may send the input text data to the remote system 120 via an application operating on the device and in communication with the remote system 120.

A speech-capture device 110a (e.g., a device that is capable of detecting a user's speech and converting the audio 11 of the speech into audio data 211) may receive input audio 11, corresponding to a spoken utterance corresponding at least in part to a command, using an audio capture component, such as a microphone or array of microphones. The device 110, using a wakeword detection component 220, processes input audio data corresponding to the input audio 11 to determine if a keyword (e.g., a wakeword) is detected in the input audio data. Following detection of a wakeword, the device 110 sends input audio data 211, corresponding to the utterance, to the remote system 120.

Upon receipt by the remote system 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. In some examples, the speech processing component 240 may include an ASR component 250 and an NLU component 260 that are configured to process the input audio data 211 to generate NLU data. However, the disclosure is not limited thereto and in other examples, the speech processing component 240 may include a spoken language understanding (SLU) component 255 that is configured to process the input audio data 211 to generate the NLU data, as will be described in greater detail below with regard to FIGS. 5A-6B. Additionally or alternatively, the speech processing component 240 may include the ASR component 250, the NLU component 260 and/or the SLU component 255 without departing from the disclosure.

An ASR component 250 of the speech processing component 240 transcribes the input audio data 211 into input text data representing one more hypotheses representing speech contained in the input audio data 211. The ASR component 250 interprets the utterance in the input audio data 211 based on a similarity between the utterance and pre-established language models. For example, the ASR component 250 may compare the input audio data 211 with models for sounds (e.g., subword units, such as phonemes, etc.) and sequences of sounds to identify words that match the sequence of sounds spoken in the utterance represented in the input audio data 211. The ASR component 250 sends (either directly or via the orchestrator component 230) the input text data generated thereby to an NLU component 260 of the speech processing component 260. The input text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The orchestrator 230 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a quiz game skill, where multiple questions are asked of the user and the user responds with utterances that are processed by the system and whose text data is sent to the quiz show skill. Each utterance of the dialog may have a unique utterance ID but may also share a common dialog ID so that the system can process incoming audio data knowing that it is associated with a particular dialog.

Alternatively, a device (such as a mobile device) may send input text data to the remote system 120. Upon receipt by the remote system 120, the input text data may be sent to the orchestrator component 230. The orchestrator component 230 may send the input text data to the NLU component 260 for processing as if the input text data came from the ASR component 250.

The NLU component 260 attempts to make a semantic interpretation of the phrases or statements represented in the input text data input therein. That is, the NLU component 260 (as described in detail herein) determines one or more meanings associated with the phrases or statements represented in the input text data based on individual words represented in the input text data. The NLU component 260 determines an intent (e.g., an action that a user desires be performed) of a command represented in the input text data as well as pertinent pieces of information in the input text data that allow a device (e.g., the device 110, the remote system 120, the skill server(s) 125, etc.) to execute the intent. For example, if the input text data corresponds to "call mom," the NLU component 260 may determine a user intended to activate a telephone in his/her device and to initiate a call with a contact matching the entity "mom."

The remote system 120 may include an aggregator component 265 that receives NLU results data and determines (as described in detail herein) which skill(s) 290 and/or skill server(s) 125 to the system should call to execute an input command. The aggregator component 265 may be implemented separately from the orchestrator component 230 (as illustrated) or one or more components of the aggregator component 265 may be implemented as part of the orchestrator component 230.

When audio data of an utterance is received, ASR is performed to determine text corresponding to the audio data and NLU is performed to determine what intent/action is intended by the utterance. Depending on the NLU output data, a directive is sent to a skill component or skill component for handling the action called for in the utterance.

A "skill" component may include software running on the remote system 120 that is akin to an application. That is, a skill 290 may enable the remote system 120 to execute specific functionality in order to provide data or produce some other output requested by a user. The remote system 120 may be configured with more than one skill 290. For example, a weather service skill may enable the remote system 120 to provide weather information, a car service skill may enable the remote system 120 to book a trip with respect to a taxi or ride sharing service, an order pizza skill may enable the remote system 120 to order a pizza with respect to a restaurant's online ordering system, etc. A skill component may include hardware, software, firmware, or the like that may be dedicated to the particular skill or shared among different components. The skill component may be part of the remote system 120 (for example as skill 290) or may be located at whole (or in part) with separate skill server(s) 125. Skill server(s) 125 may communicate with skills 290 within the remote system 120 and/or directly with the orchestrator 230 or with other components. For present purposes, unless expressly stated otherwise, reference to a skill or skill component (such as skill 290) may include a skill component operating within remote system 120 and/or skill operating within skill server(s) 125.

A skill 290 may be configured to perform one or more actions. That is, a skill component may execute specific functionality in order to provide data or produce some other output requested by a user. A particular skill component may be configured to execute more than one action. For example, a weather service skill involve a skill component providing weather information to the remote system 120, a car service skill may involve a skill component booking a trip with respect to a taxi or ride sharing service, an order pizza skill may involve a skill component ordering a pizza with respect to a restaurant's online ordering system, etc.

A skill(s) 290 and may be in communication with one or more skill servers 125 implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

In some instances, a skill(s) 290 or a skill server(s) 125 may provide output text data responsive to the present user command. The remote system 120 may include a text-to-speech (TTS) component 280 that generates output audio data from skill(s) 290 and skill server(s) 125 provided output text data. The TTS component 280 may use different synthesis techniques. In one method of synthesis called unit selection, the TTS component 280 matches text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder.

The remote system 120 may include a user recognition component 295. The user recognition component 295 may take as input the input audio data 211 and/or input text data output by the ASR component 250 as well as potential other input data such as video, biometric data, or the like. The user recognition component 295 determines scores indicating whether the command originated from a particular user. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing audio characteristics in the input audio data 211 to stored audio characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform NLU processing as well as processing performed by skills 290 and/or skill servers 125, routing by the action manager 275, or other functions.

The remote system 120 may include a user profile storage 270. The user profile storage 270 may include a variety of information related to individual users, groups of users, etc. that interact with the system. The user profile storage 270 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may include preference data specific to the user associated therewith. That is, each user profile may include preference data unique from one or more other user profiles encompassed by the same customer profile. The preference data may include information indicating what preferences the user has with regard to certain skills or other information. A user profile may be a stand-alone profile or may be encompassed under a customer profile. A user profile may also include history data which may be data representative of previous interactions between the user of the user profile and the system. A user profile may incorporate information associating one device with another. For example, if a user has one speech-capture device (such as an Echo Dot) in the same room as a media playback device (such as a Fire TV), the user may indicate the two devices should be linked, thus allowing the system to more easily recognize spoken media playback commands received by the Echo Dot may be intended to cause media to playback on the Fire TV. Thus the system may store an association between the devices as part of the user's (or other) profile. This may result in the system linking multiple devices as one "virtual device" where the system may treat the linked devices as a single device for certain purposes. For example, multiple loudspeakers may be linked as a single audio output device for purposes of playing music through multiple speakers simultaneously (e.g., as part of a surround sound system). As another example, an Echo Dot and Fire TV may be linked for purposes of capturing audio commands that request video playback. As illustrated, the user profile storage 270 is implemented as part of the remote system 120. However, it should be appreciated that the user profile storage 270 may be located proximate to the remote system 120, or may otherwise be in communication with the remote system 120, for example over the network(s) 199. User profile data may be used to inform NLU processing as well as processing performed by skills 290.

Figure 3:
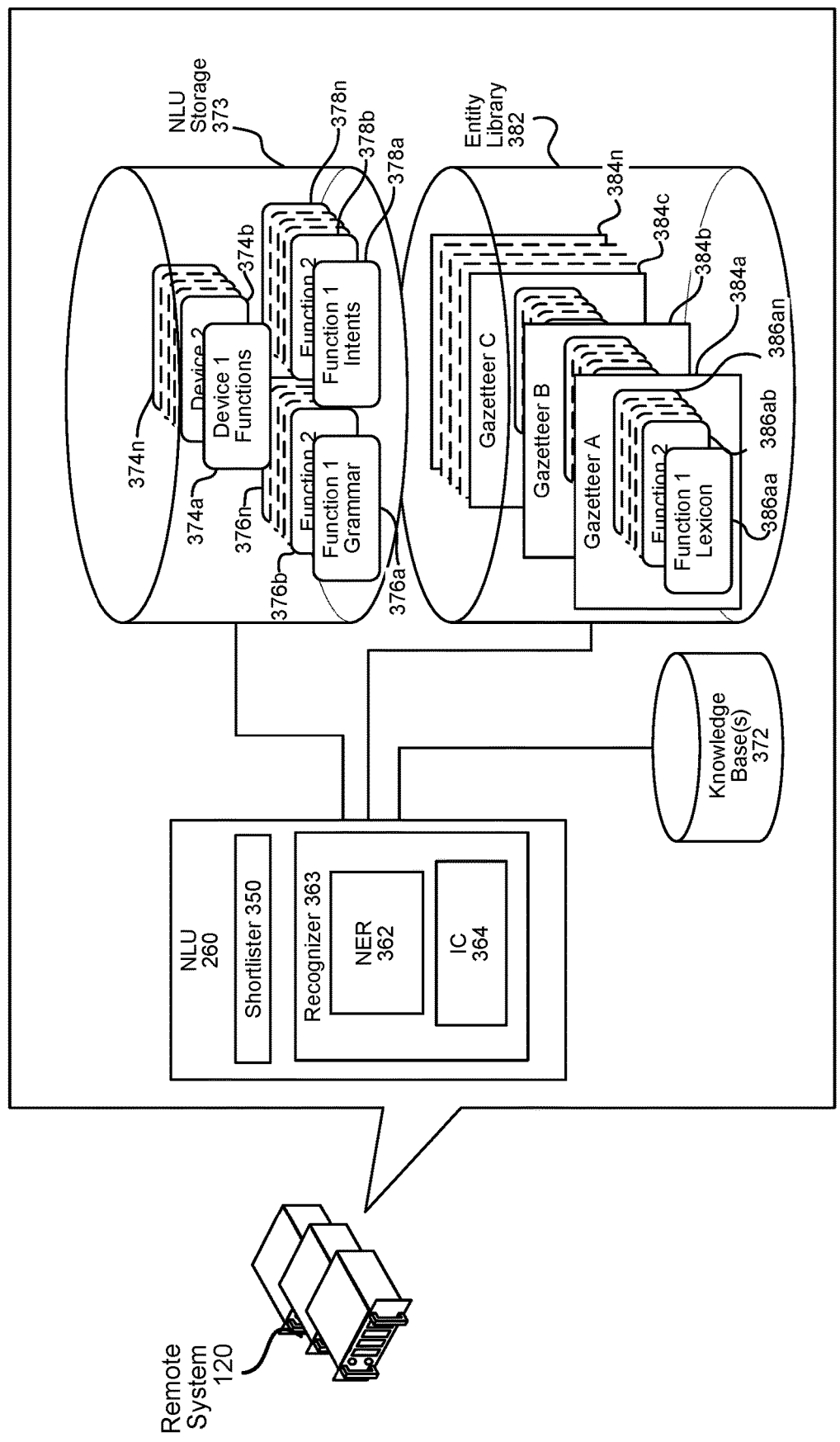
FIG. 3 is a conceptual diagram of how natural language processing is performed according to embodiments of the present disclosure.

FIG. 3 illustrates how NLU processing is performed on input text data. Generally, the NLU component 260 attempts to make a semantic interpretation of text represented in text data. That is, the NLU component 260 determines the meaning behind the text represented in text data based on the individual words. The NLU component 260 interprets text to derive an intent or a desired action of the user as well as the pertinent pieces of information in the text that allow a device (e.g., device 110a, device 110b, remote system 120, skill(s) 290, skill server(s) 125) to complete that action.

The NLU component 260 may process text data including several hypotheses of a single utterance. For example, if the ASR component 250 outputs ASR results including an N-best list of hypotheses, the NLU component 260 may process the text data with respect to all (or a portion of) the textual interpretations represented therein.

The NLU e component 260 may annotate text represented in text data by parsing and/or tagging the text. For example, for the text "tell me the weather for Seattle," the NLU component 260 may tag "tell me the weather for Seattle" as a command (e.g., to output weather information) as well as tag "Seattle" as a location for the weather information.

The NLU component 260 may include a shortlister component 350. The shortlister component 350 selects applications that may execute with respect to text data 410 input to the NLU component (e.g., applications that may execute the command). The shortlister component 350 thus limits downstream, more resource intensive NLU processes to being performed with respect to applications that may execute the command.

Without a shortlister component 350, the NLU component 260 may process a given hypothesis with respect to every application of the system, either in parallel, in series, or using some combination thereof. By implementing a shortlister component 350, the NLU component 260 may process a given hypothesis with respect to only the applications that may execute the command. This reduces total compute power and latency attributed to NLU processing.

The NLU component 260 may include one or more recognizers 363. Each recognizer 363 may be associated with a different "function" or "content source" (e.g., a different skill 290 or skill). The NLU component 260 may determine a function potentially associated with the command represented in text data input thereto in order to determine the proper recognizer 363 to process the hypothesis. The NLU component 260 may determine a command represented in text data is potentially associated with more than one function. Multiple recognizers 363 may be functionally linked (e.g., a telephony/communications recognizer and a calendaring recognizer may utilize data from the same contact list).

If the shortlister component 350 determines text corresponding to a hypothesis is potentially associated with multiple skills 290, the recognizers 363 associated with the skills 290 (e.g., the recognizers 363 associated with the applications in the subset selected by the shortlister 350) may process the text. The selected recognizers 363 may process the text in parallel, in series, partially in parallel, etc. For example, if text corresponding to a hypothesis potentially implicates both a communications application and a music application, a recognizer associated with the communications application may process the text in parallel, or partially in parallel, with a recognizer associated with the music application processing the text. The output generated by each recognizer 363 may be scored, with the overall highest scored output from all recognizers 363 ordinarily being selected to be the correct result.

If the NLU component 260 determines a command represented in text data is potentially associated with multiple functions, the recognizers 363 associated with the functions may each process the text data in parallel. For example, if a command potentially implicates both a communications function and a music function, a recognizer associated with the communications function may process the text data in parallel, or substantially in parallel, with a recognizer associated with the music function processing the text data. The output generated by each recognizer may be scored to indicate the respective recognizers confidence in its processing of the text data.

The NLU component 260 may communicate with various storages to determine the potential function(s) associated with a command represented in text data. The NLU component 260 may communicate with an NLU storage 373, which includes databases of devices (374a-374n) identifying functions associated with specific devices. For example, the device 110a may be associated with functions for music, calendaring, contact lists, device-specific communications, etc. In addition, the NLU component 260 may communicate with an entity library 382, which includes database entries about specific services on a specific device, either indexed by device ID, user ID, or group user ID, or some other indicator.

Each recognizer 363 may include a named entity recognition (NER) component 362. The NER component 362 attempts to identify grammars and lexical information that may be used to construe meaning with respect to a command represented in text data input therein. The NER component 362 identifies portions of text represented in text data input into the NLU component 260 that correspond to a named entity that may be recognizable by the system. The NER component 362 (or other component of the NLU component 260) may also determine whether a word refers to an entity that is not explicitly mentioned in the utterance text, for example "him," "her," "it" or other anaphora, exophora or the like.

Each recognizer 363, and more specifically each NER component 362, may be associated with a particular grammar model and/or database 376, a particular set of intents/actions 378, and a particular personalized lexicon 386. Each gazetteer 384 may include function-indexed lexical information associated with a particular user and/or device. For example, the Gazetteer A (384a) includes function-indexed lexical information 386aa to 386an. A user's music function lexical information might include album titles, artist names, and song names, for example, whereas a user's contact-list lexical information might include the names of contacts. Since every user's music collection and contact list is presumably different, this personalized information improves entity resolution.

An NER component 362 applies grammar models 376 and lexical information 386 associated with the function (associated with the recognizer 363 implementing the NER component 362) to determine a mention one or more entities in text data input thereto. In this manner, the NER component 362 identifies "slots" (i.e., particular words in text data) that may be needed for later command processing. The NER component 362 may also label each slot with a type of varying levels of specificity (e.g., noun, place, city, artist name, song name, etc.).

Each grammar model 376 includes the names of entities (i.e., nouns) commonly found in text about the particular function to which the grammar model 376 relates, whereas the lexical information 386 is personalized to the user(s) and/or the device 110 from which the input audio data 211 or input text data 213 originated. For example, a grammar model 376 associated with a shopping function may include a database of words commonly used when people discuss shopping.

A downstream process called named entity resolution actually links a portion of text to an actual specific entity known to the system. To perform named entity resolution, the NLU component 260 may utilize gazetteer information (384a-384n) stored in an entity library storage 382. The gazetteer information 384 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 363 may also include an intent classification (IC) component 364. The IC component 364 parses an text data to determine an intent(s) of the function associated with the recognizer 363 that potentially corresponds to the text data. An intent corresponds to an action to be performed that is responsive to the command represented by the text data. The IC component 364 may communicate with a database 378 of words linked to intents. For example, a music intent database may link words and phrases such as "quiet," "volume off," and "mute" to a "mute" intent. The IC component 364 identifies potential intents by comparing words in the text data to the words and phrases in an intents database 378 associated with the function that is associated with the recognizer 363 implementing the IC component 364.

The intents identifiable by a specific IC component 364 are linked to function-specific (i.e., the function associated with the recognizer 363 implementing the IC component 364) grammar frameworks 376 with "slots" to be filled. Each slot of a grammar framework 376 corresponds to a portion of the text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the function associated with the recognizer 363 implementing the NER component 362, attempting to match words and phrases in the text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music function recognizer 363 may parse and tag text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music function, which an IC component 364 (also implemented by the music function recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search the database of generic words associated with the function (in the knowledge base 372). For example, if the text data including text corresponding to "play songs by the rolling stones," after failing to determine an album name or song name called "songs" by "the rolling stones," the NER component 362 may search the function's vocabulary for the word "songs." In the alternative, generic words may be checked before the gazetteer information, or both may be tried, potentially producing two different results.

The NLU component 260 may tag text to attribute meaning to the text. For example, the NLU component 260 may tag "play mother's little helper by the rolling stones" as: {intent} <PlayMusic>, {artist name} rolling stones, {media type} SONG, and {song title} mother's little helper. For further example, the NLU component 260 may tag "play songs by the rolling stones" as: {intent} <PlayMusic>, {artist name} rolling stones, and {media type} SONG.

Figure 4:
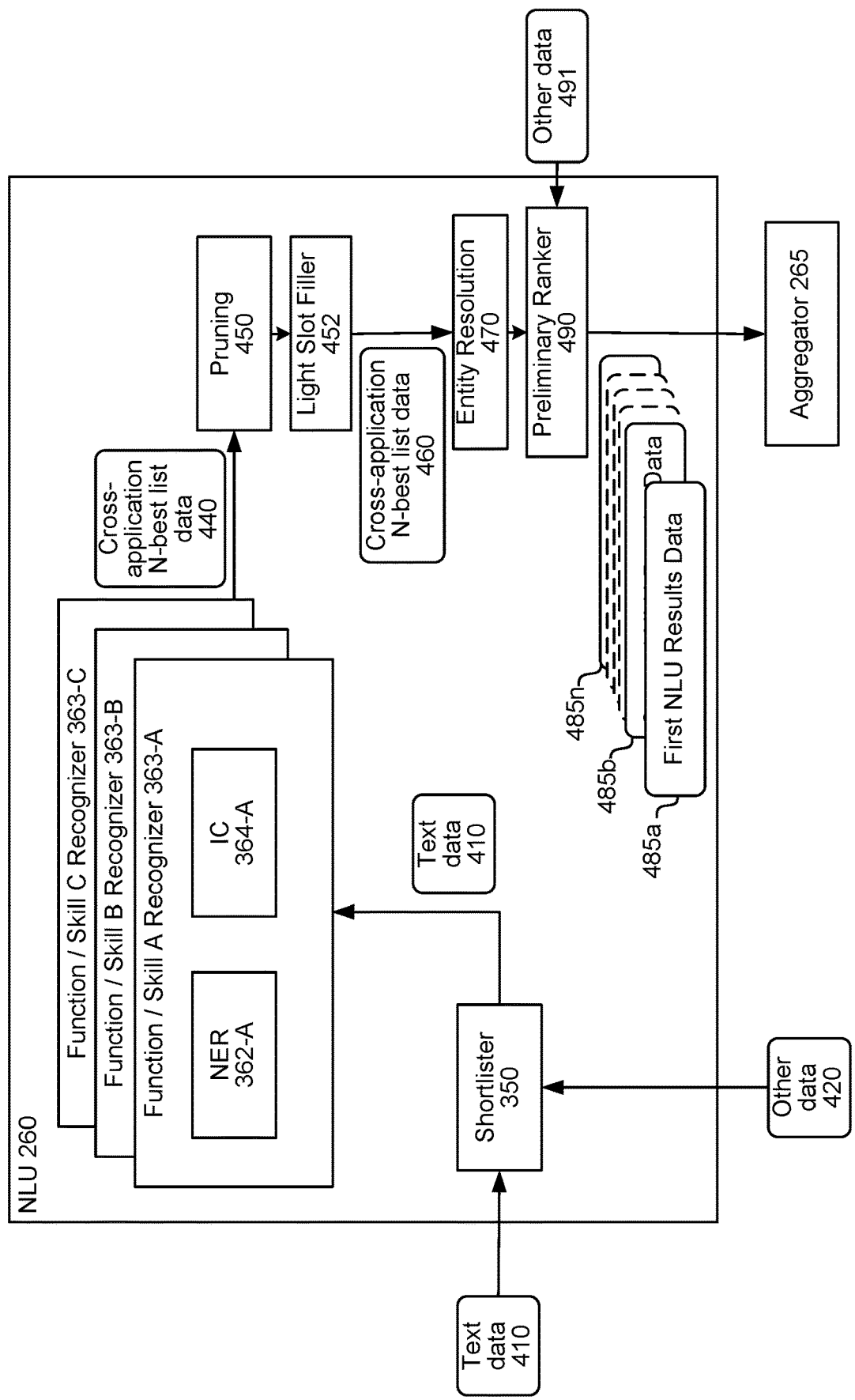
FIG. 4 is a conceptual diagram of how natural language processing is performed according to embodiments of the present disclosure.

The shortlister component 350 may receive text data 410 output from the ASR component 250 (as illustrated in FIG. 4). The ASR component 250 may embed the text data 410 into a form processable by a trained model(s) using sentence embedding techniques as known in the art. Sentence embedding results in the text data 410 including text in a structure that enables the trained models of the shortlister component 350 to operate on the text. For example, an embedding of the text data 410 may be a vector representation of the text data.

The shortlister component 350 may make binary determinations (e.g., yes or no) regarding which skill(s) 290 relate to the text data 410. The shortlister component 350 may make such determinations using the one or more trained models described herein above. If the shortlister component 350 implements a single trained model for each skill 290, the shortlister component 350 may simply run the models that are associated with enabled applications as indicated in a profile (e.g., profile 502) associated with the device 110 and/or user that originated the command.

The shortlister component 350 may generate N-best list data representing applications that may execute with respect to the command represented in the text data 410. The size of the N-best list represented in the N-best list data is configurable. In an example, the N-best list data may indicate every application of the system as well as contain an indication, for each application, regarding whether the application is likely capable to execute the command represented in the text data 410. In another example, instead of indicating every application of the system, the N-best list data may only indicate all of the applications that are likely to be able to execute the command represented in the text data 410. In yet another example, the shortlister component 350 may implement thresholding such that the N-best list data may indicate no more than a maximum number of applications that may execute the command represented in the text data 410. In an example, the threshold number of applications that may be represented in the N-best list data is ten (10). In another example, the applications included in the N-best list data may be limited by a threshold a score, where only applications indicating a likelihood to handle the command is above a certain score (as determined by processing the text data 410 by the shortlister component 350 relative to such applications).

The NLU component 260 may compile data, output by each of the recognizers 363 that processed the text data input to the NLU component 260, into a single N-best list, and may send N-best list data 440 (representing the N-best list) to a pruning component 450 (as illustrated in FIG. 4). Each entry in the N-best list data 440 may correspond to tagged text output by a different recognizer 363. Each entry in the N-best list data 440 may be associated with a respective score indicating the tagged text corresponds to the function associated with the recognizer 363 from which the tagged text was output. For example, the N-best list data 440 may be represented as:

[0.95] Intent: <PlayMusic> ArtistName: Lady Gaga SongName: Poker Face ContentSource: Music Skill

[0.70] Intent: <PlayVideo> ArtistName: Lady Gaga VideoName: Poker Face ContentSource: Video Skill

[0.01] Intent: <PlayMusic> ArtistName: Lady Gaga AlbumName: Poker Face ContentSource: Music Skill

[0.01] Intent: <PlayMusic> SongName: Pokerface ContentSource: Music Skill

The pruning component 450 creates a new, shorter N-best list (i.e., represented in N-best list data 460 discussed below) based on the N-best list data 440. The pruning component 450 may sort the tagged text represented in the N-best list data 440 according to their respective scores.

The pruning component 450 may perform score thresholding with respect to the N-best list data 440. For example, the pruning component 450 may select entries represented in the N-best list data 440 associated with a score satisfying (e.g., meeting and/or exceeding) a score threshold. The pruning component 450 may also or alternatively perform number of entry thresholding. For example, the pruning component 450 may select the top scoring entry(ies) associated with each different category of function (e.g., music, shopping, communications, etc.) represented in the N-best list data 440, with the new N-best list data 460 including a total number of entries meeting or falling below a threshold number of entries. The purpose of the pruning component 450 is to create a new list of top scoring entries so that downstream, more resource intensive processes may only operate on the tagged text entries that most likely correspond to the command input to the system.

The NLU component 260 may also include a light slot filler component 452. The light slot filler component 452 can take text from slots represented in the tagged text entry(ies) output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a tagged text entry includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the N-best list data 460.

The NLU component 260 sends the N-best list data 460 to an entity resolution component 470. The entity resolution component 470 can apply rules or other instructions to standardize labels or tokens from previous stages into an intent/slot representation. The precise transformation may depend on the function (e.g., for a travel function, the entity resolution component 470 may transform a text mention of "Boston airport" to the standard BOS three-letter code referring to the airport). The entity resolution component 470 can refer to an authority source (e.g., a knowledge base) that is used to specifically identify the precise entity referred to in each slot of each tagged text entry represented in the N-best list data 460. Specific intent/slot combinations may also be tied to a particular source, which may then be used to resolve the text. In the example "play songs by the stones," the entity resolution component 470 may reference a personal music catalog, Amazon Music account, user profile (described herein), or the like. The entity resolution component 470 may output data including an altered N-best list that is based on the N-best list represented in the N-best list data 460, but also includes more detailed information (e.g., entity IDs) about the specific entities mentioned in the slots and/or more detailed slot data that can eventually be used by a function. The NLU component 260 may include multiple entity resolution components 470 and each entity resolution component 470 may be specific to one or more functions.

The entity resolution component 470 may not be successful in resolving every entity and filling every slot represented in the N-best list data 460. This may result in the entity resolution component 470 outputting incomplete results. The NLU component 260 may include a final ranker component 490, which may consider such errors when determining how to rank the tagged text entries for potential execution. For example, if a book function recognizer 363 outputs a tagged text entry including a <ReadBook> intent flag, but the entity resolution component 470 cannot find a book with a title matching the text of the item, the final ranker component 490 may re-score that particular tagged text entry to be given a lower score. The final ranker component 490 may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The final ranker component 490 may apply re-scoring, biasing, or other techniques to obtain the most preferred tagged and resolved text entry. To do so, the final ranker component 490 may consider not only the data output by the entity resolution component 470, but may also consider other data 491. The other data 491 may include a variety of information. For example, the other data 491 may include function rating or popularity data. For example, if one function has a particularly high rating, the final ranker component 490 may increase the score of a tagged text entry(ies) associated with or otherwise invoking that particular function. The other data 491 may also include information about functions that have been specifically enabled by the user. For example, the final ranker component 490 may assign higher scores to tagged text entries associated with or otherwise invoking enabled functions than tagged text entries associated with or otherwise invoking nonenabled functions. User history may also be considered, such as if the user regularly uses a particular function or does so at particular times of day. Date, time, location, weather, type of device 110, user ID, context, and other information may also be considered. For example, the final ranker component 490 may consider when any particular functions are currently active (e.g., music being played, a game being played, etc.). Following final ranking, the NLU component 260 may output NLU output data 485 to the orchestrator component 230. The NLU output data 485 may include various entries, with each entry representing an NLU processing confidence score, an intent, slot data, and a potential skill or skill that may operating with respect to the respective entry's data.

Following preliminary ranking, the NLU component 260 may output NLU results data 485. The NLU component 260 may send the NLU results data 485 to the orchestrator component 230, which sends the NLU results data 485 to the aggregator component 265. The NLU results data 485 may include first NLU results data 485a including tagged text associated with a first skill, second NLU results data 485b including tagged text associated with a second skill, etc. The NLU results data 485 may include tagged text data corresponding to the top scoring tagged text entries as determined by the preliminary ranker component 490.

The orchestrator component 230 may send data output from the NLU component 260 to a aggregator component 265. The data 485 output from the NLU component 260 may include an N-best list of NLU results, where each item in the N-best list may correspond to a particular recognizer 363 and corresponding skill 290. Thus, for example, first NLU results of the N-best list may be associated with a first skill 290a, second NLU results of the N-best list may be associated with a second skill 290b, third NLU results of the N-best list may be associated with a third skill 290c, etc. Moreover, the first NLU results may correspond to text tagged to attribute meaning that enables the first skill 290a to execute with respect to the first NLU results, the second NLU results may correspond to text tagged to attribute meaning that enables the second skill 290b to execute with respect to the second NLU results, the third NLU results may correspond to text tagged to attribute meaning that enables the third skill 290c to execute with respect to the third NLU results, etc. The data 485 may also include scores corresponding to each item in the N-best list. Alternatively, the NLU result data 485 output to a particular skill 290 may include NER and IC data output by the particular skill's recognizer 363 while the NLU result data 485 output to the aggregator component 265 may include only a portion of the NLU result data 485, for example the scores corresponding to certain skills.

The system may be configured with thousands, tens of thousands, etc. skills 290. The aggregator component 265 enables the system to better determine the best skill 290 to execute the command input to the system. For example, first NLU results may correspond or substantially correspond to second NLU results, even though the first NLU results are operated on by a first skill 290a and the second NLU results are operated on by a second skill 290b. The first NLU results may be associated with a first confidence score indicating the system's confidence with respect to NLU processing performed to generate the first NLU results. Moreover, the second NLU results may be associated with a second confidence score indicating the system's confidence with respect to NLU processing performed to generate the second NLU results. The first confidence score may be similar or identical to the second confidence score since the first NLU results correspond or substantially correspond to the second NLU results. The first confidence score and/or the second confidence score may be a numeric value (e.g., from 0.0 to 1.0). Alternatively, the first confidence score and/or the second confidence score may be a binned value (e.g., low, medium, high).

The aggregator component 265 (or other scheduling component such as orchestrator component 230) may solicit the first skill 290a and the second skill 290b to provide potential result data based on the first NLU results and the second NLU results, respectively. For example, the aggregator component 265 may send the first NLU results to the first skill 290a along with a request for the first skill 290a to at least partially execute a command with respect to the first NLU results. The aggregator component 265 may also send the second NLU results to the second skill 290b along with a request for the second skill 290b to at least partially execute a command with respect to the first NLU results. The aggregator component 265 receives, from the first skill 290a, first result data generated from the first skill's execution with respect to the first NLU results. The aggregator component 265 also receives, from the second skill 290b, second results data generated from the second skill's execution with respect to the second NLU results.

The result data 430 may include various components. For example, the result data 430 may include content (e.g., audio data, text data, and/or video data) to be output to a user. The result data 430 may also include a unique identifier (ID) used by the remote system 120 and/or the skill server(s) 125 to locate the data to be output to a user. The result data 430 may also include a directive. For example, if the command corresponds to "turn on the light," the result data 430 may include a directive causing the system to turn on a light associated with a profile of the device (110a/110b) and/or user.

The orchestrator component 230 may, prior to sending the NLU results data 485 to the aggregator component 265, associate intents in the NLU results data 485 with skills 290. For example, if the NLU results data 485 includes a <PlayMusic> intent, the orchestrator component 230 may associate the NLU results data 485 with one or more skills 290 that can execute the <PlayMusic> intent. Thus, the orchestrator component 230 may send the NLU results data 485 paired with skills 290 to the aggregator component 265. In response to input text data corresponding to "what should I do for dinner today," the orchestrator component 230 may generates pairs of skills 290 with associated intents corresponding to:

Skill 1/<Help>
Skill 2/<Order>
Skill 3/<DishType>

A system that does not implement the aggregator component 265 may select the highest scored preliminary ranked NLU results data 485 associated with a single skill. The system may send the NLU results data 485 to the skill 290 along with a request for output data. In some situations, the skill 290 may not be able to provide the system with output data. This results in the system indicating to the user that the command could not be processed even though another skill associated with lower ranked NLU results data 485 could have provided output data responsive to the command.

Figure 5A:
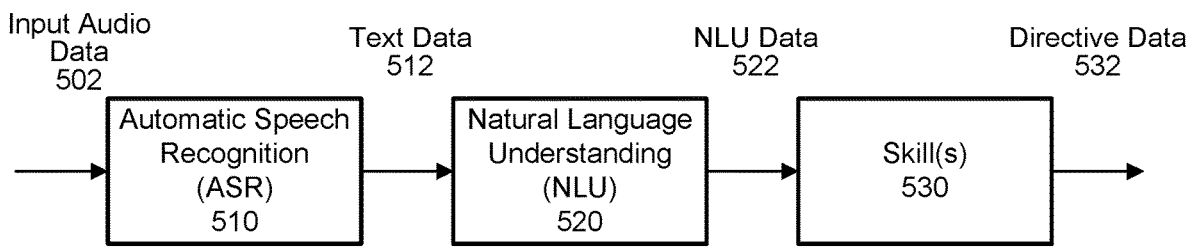
FIG. 5A illustrates an example of a conventional speech processing system that includes an automatic speech recognition (ASR) component and a natural language understanding (NLU) component.

FIG. 5A illustrates an example of a conventional speech processing system that includes an automatic speech recognition (ASR) component and a natural language understanding (NLU) component. As illustrated in FIG. 5A, input audio data 502 may be processed by an ASR component 510 to generate text data 512, the text data 512 may be processed by an NLU component 520 to generate NLU data 522, and the NLU data 522 may be processed by skill(s) 530 to generate directive data 532. An example of the ASR component 510 and the NLU component 520 are described above with regard to the ASR component 250 and the NLU component 260 included within the remote system 120.

Figure 5B:
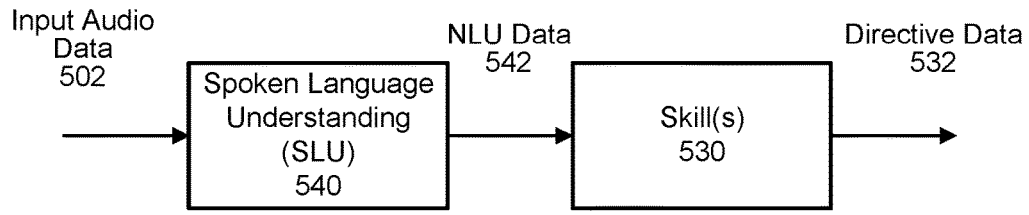
FIGS. 5B-5C illustrate examples of a spoken language understanding (SLU) component according to embodiments of the present disclosure.
Figure 5C:
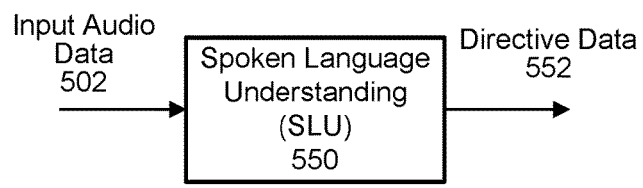

FIGS. 5B-5C illustrate examples of a spoken language understanding (SLU) component according to embodiments of the present disclosure. As illustrated in FIG. 5B, in some examples a spoken language understanding (SLU) component 540 may be equivalent to the ASR component 510 and the NLU component 520. For example, the SLU component 540 may process the input audio data 502 and generate NLU data 542. The NLU data 542 may include intent data and/or slot data (e.g., "NLU result") so that directives may be determined based on the intent data and/or the slot data. While the SLU component 540 may be equivalent to a combination of the ASR component 510 and the NLU component 520, the SLU component 540 may process the input audio data 502 and directly generate the NLU data 542, without an intermediate step of generating the text data 512. Thus, the SLU component 540 takes the input audio data 502 representing an utterance and attempts to make a semantic interpretation of the utterance. That is, the SLU component 540 determines a meaning associated with the utterance and then implements that meaning. For example, the SLU component 540 may interpret the input audio data 502 representing an utterance from the user 5 in order to derive an intent or a desired action or operation from the user 5. In some examples, the SLU component 540 outputs the most likely NLU response (e.g., hypothesis) recognized in the audio data, or multiple hypotheses in the form of a lattice or an N-best list with individual hypotheses corresponding to confidence scores or other scores (such as probability scores, etc.).

In the example illustrated in FIG. 5B, the NLU data 542 generated by the SLU component 540 is equivalent to the NLU data 522 generated by the NLU component 520. Thus, the NLU data 542 may be processed by the skill(s) 530 to generate the directive data 532. However, the disclosure is not limited thereto and in some examples, the SLU component may generate directive data directly without generating the NLU data.

As illustrated in FIG. 5C, in some examples an SLU component 550 may be equivalent to the ASR component 510, the NLU component 520 and the skill(s) 530. For example, the SLU component 540 may process the input audio data 502 and generate directive data 552, which corresponds to a directive (e.g., command) that may be executed by the device 110, the remote system 120 or any other device to perform an action. Thus, the SLU component 540 may directly process the input audio data 502 to generate the directive data 552, without generating the text data 512 and/or the NLU data 522/542.

As illustrated in FIG. 5C, the SLU component 550 takes the input audio data 502 representing an utterance and attempts to generate a directive corresponding to the utterance. That is, the SLU component 550 determines a directive that corresponds to an implicit intent of the utterance, although the SLU component 550 does not determine an intent and/or generate the NLU data 542 like the SLU component 540. For example, the SLU component 550 may interpret the input audio data 502 representing an utterance from the user 5 in order to derive a directive to perform an action indicated by the user 5. In some examples, the SLU component 540 outputs the most likely directive (e.g., hypothesis) recognized in the audio data, or multiple hypotheses in the form of a lattice or an N-best list with individual hypotheses corresponding to confidence scores or other scores (such as probability scores, etc.).

The device 110 may include the SLU component 540 and/or the SLU component 550 without departing from the disclosure. For example, a first device 110a configured to perform a large number of potential voice commands (e.g., select from a large number of unique directives) may include the SLU component 540, as the NLU data may be beneficial to determine a specific action to perform. For example, the NLU data may include information associated with the intent and/or entities that may be interpreted differently by multiple skills. In contrast, a second device 110b configured to perform a discrete number of potential voice commands (e.g., select from a small number of unique directives) may include the SLU component 550, as the second device 110b may be configured to accurately select from the limited number of potential actions to perform. For example, the second device 110b may only control a limited number of light switches associated with the user 5, and the SLU component 550 may be configured to accurately select from the available light switches when generating the directive data.

Figure 6A:
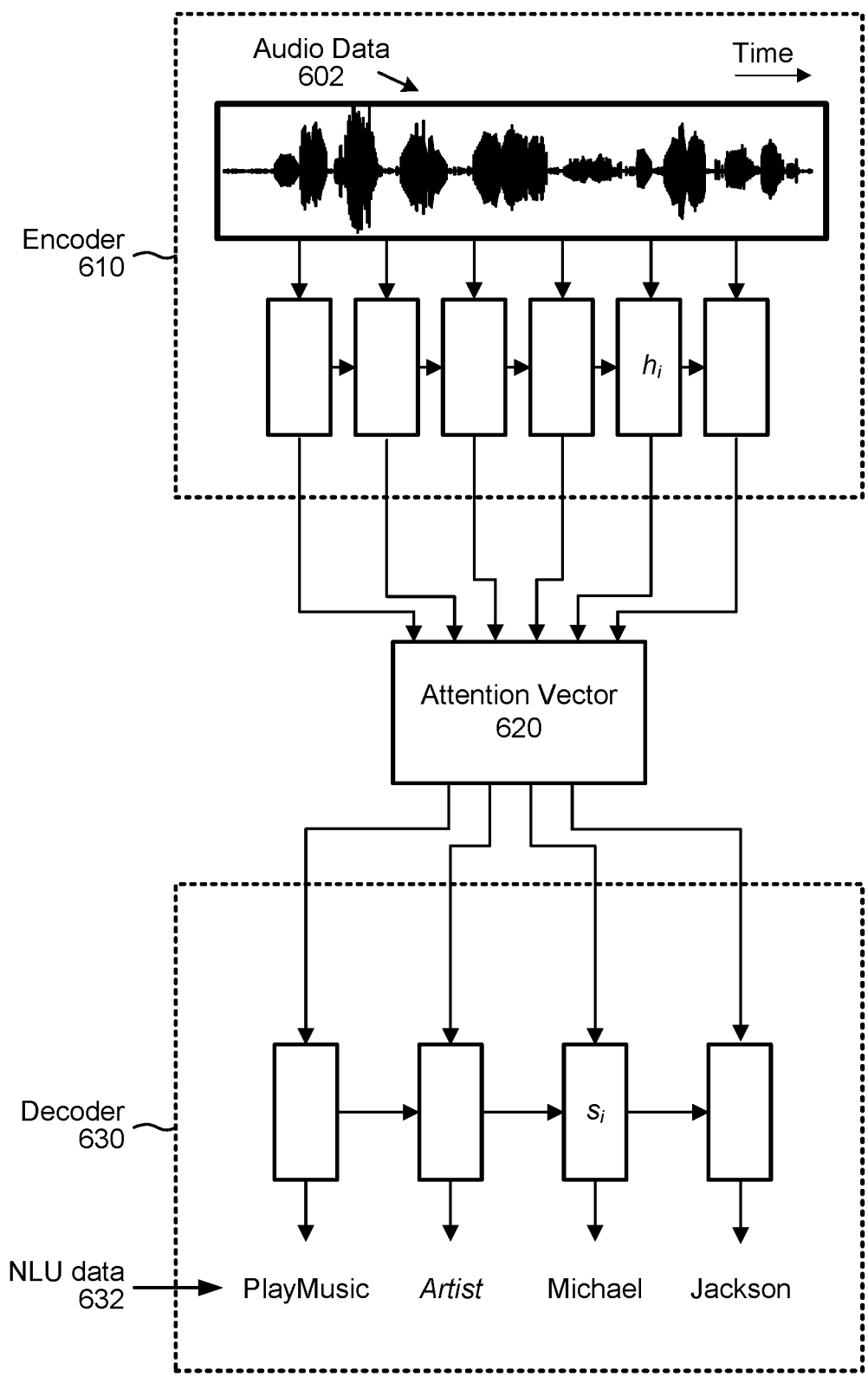
FIGS. 6A-6B illustrate examples of encoders/decoders used in a SLU component according to embodiments of the present disclosure.
Figure 6B:
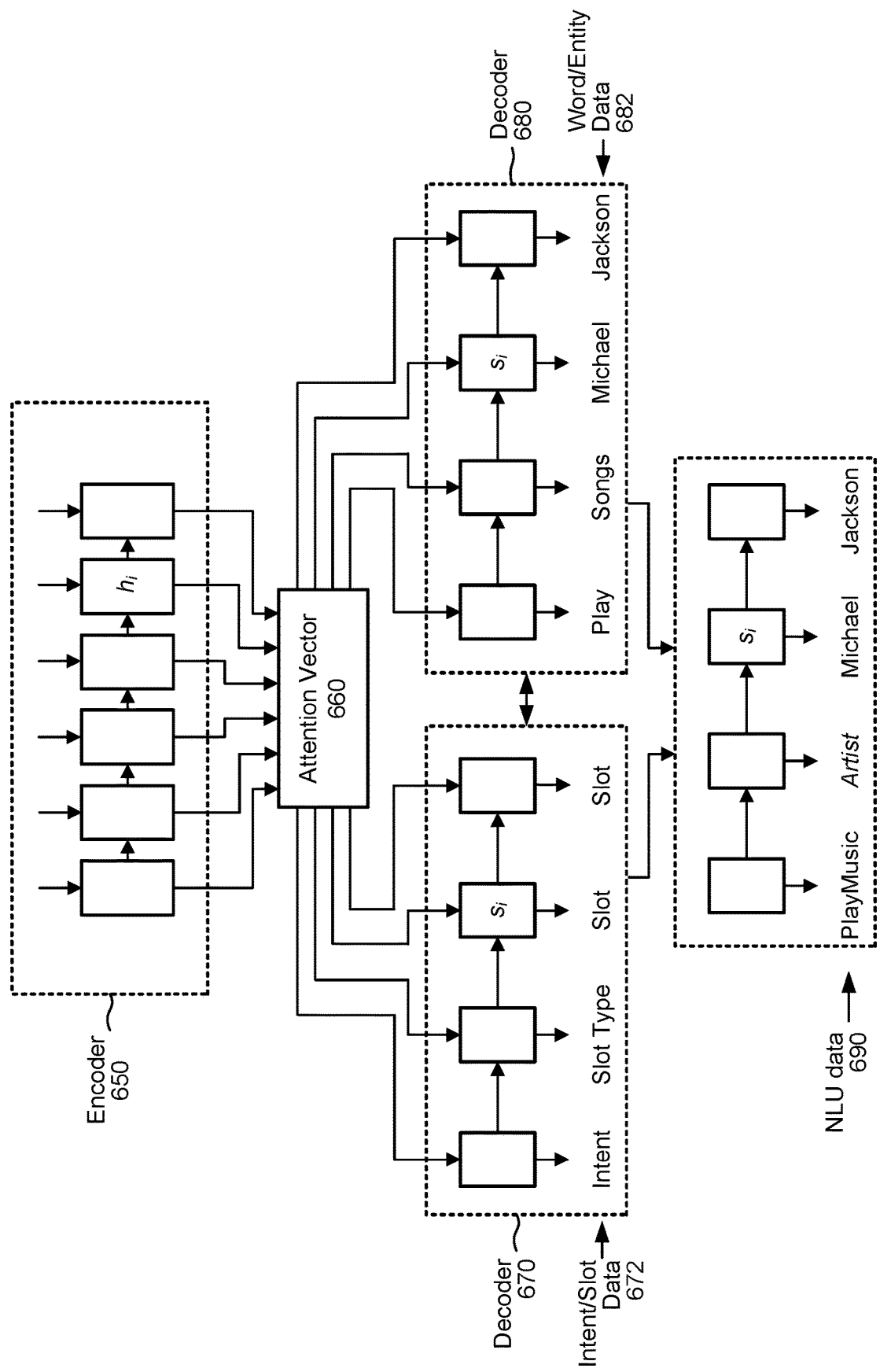

FIGS. 6A-6B illustrate examples of encoders/decoders used in a SLU component according to embodiments of the present disclosure. In some examples, the SLU component 540 illustrated in FIG. 5B may include a single encoder and a single decoder to generate the NLU data. For example, FIG. 6A illustrates an encoder 610 that is configured to process input audio data (e.g., audio data 602) over time to generate an attention vector/context for a decoder 630. Thus, the encoder 610 includes an encoding mechanism that operates on the audio data 602 (e.g., using a uni-directional or bi-directional Long Short Term Memory network (LSTM), gated recurrent unit (GRU), and/or recurrent neural network (RNN) structure) to generate encoded audio frames.

FIG. 6A illustrates the encoded audio frames being input to an attention vector 620 and the decoder 630 receiving data associated with an individual sequence of the encoded audio frames. For example, the encoded audio frames may be utilized with an attention mechanism during decoding (e.g., NLU tagging and/or slot filling), wherein an attention vector/context is created at each time step at decoding using a previous state of the decoder 630.

As illustrated in FIG. 6A, the decoder 630 may receive a portion of the data from the attention vector 620 and may generate NLU data 632. For example, FIG. 6A illustrates the NLU data 632 corresponding to a PlayMusic intent to play music by a particular artist (e.g., Michael Jackson). However, while FIG. 6A illustrates only a single intent, the disclosure is not limited thereto and the decoder 630 may output two or more intents and/or output commands. In some examples, the decoder 630 may generate a confidence score associated with each of the intents, enabling another component compare the confidence scores and select a single intent to perform.

In some examples, the SLU component 540 illustrated in FIG. 5B may include a single encoder but two decoders to generate the NLU data. For example, FIG. 6B illustrates an encoder 650 that is configured to process input audio data over time to generate an attention vector/context for a first decoder 670 and a second decoder 680. Thus, the encoder 650 includes an encoding mechanism that operates on the audio data 602 (e.g., using a uni-directional or bi-directional Long Short Term Memory network (LSTM), gated recurrent unit (GRU), and/or recurrent neural network (RNN) structure) to generate encoded audio frames.

FIG. 6B illustrates the encoded audio frames being input to an attention vector 660 and the first decoder 670 processing data from the attention vector 660 (e.g., data associated with an individual sequence of the encoded audio frames) to identify intents and/or slots. For example, the first decoder 670 may determine intent/slot data 672 (e.g., intent data and/or slot data, indicating an intent associated with the data and a number of slots associated with the intent).

While the first decoder 670 is processing data from the attention vector 660, the second decoder 680 may be processing data from the attention vector 660 in parallel to identify words and/or entities. For example, the second decoder 680 may determine word/entity data 682, which includes words and/or entities corresponding to the slots.

As illustrated in FIG. 6B, the first decoder 670 and the second decoder 680 may process the attention vector 660 in parallel. However, instead of generating two separate outputs independently of each other and/or sequentially, the first decoder 670 and the second decoder 680 may communicate while processing the attention vector 660. In some examples, the second decoder 680 may receive a portion of the intent/slot data 672 from the first decoder 670 and may process this data to generate a portion of the word/entity data 682. For example, the second decoder 680 may receive information about intent and slots and generate word and entities within each slot. Additionally or alternatively, the first decoder 670 may receive a portion of the word/entity data 682 from the second decoder 680 and may process this data to generate a portion of the intent/slot data 672. For example, the first decoder 670 may receive information about words and entities and generate a slot type associated with an entity.

While FIG. 6B illustrates that the first decoder 670 generates intent/slot data 672 and the second decoder 680 generates word/entity data 682, the decoding process may not be linear and may include a number of iterations without departing from the disclosure. For example, the first decoder 670 may determine intent(s) and pass this information to the second decoder 680, the second decoder 680 may generate words/entities based on the intent(s) and pass the combined information back to the first decoder 670, and the first decoder 670 may determine a number of slots and fill the slots with the entities generated by the second decoder 680. However, this is intended as an illustrative example and the disclosure is not limited thereto.

Based on a combination of the intent/slot data 672 and the word/entity data 682, the decoders 670/680 may generate NLU data 690. For example, the intent/slot data 672 may indicate that an utterance (e.g., "Play songs by Michael Jackson") corresponds to an intent, a slot type, and two slots, and the word/entity data 682 may indicate that the utterance includes an entity (e.g., "Michael Jackson"). Based on the combination of the intent/slot data 672 and the word/entity data 682, the device 110 may generate the NLU data 690, indicating that the utterance corresponds to a PlayMusic intent to play music by Michael Jackson (e.g., Slot Type=Artist). While FIG. 6B illustrates the first decoder 670 generating the intent/slot data 672 and the second decoder 680 generating the word/entity data 682, this is intended for illustrative purposes and this data may be internal to the decoders 670/680. Thus, in some examples the decoders 670/680 may only output the NLU data 690 (e.g., the intent/slot data 672 and the word/entity data 682 are not output from the decoders 670/680), although the disclosure is not limited thereto.

While FIG. 6B illustrates an example of NLU data 690, the disclosure is not limited thereto and a format of the NLU data 690 may vary without departing from the disclosure. For example, the decoders may be trained based on any desired format for the NLU data 690, such that the decoders may output NLU data 690 in a particular format to be executed on the device 110. While the SLU model must be individually trained based on the desired format, the same training process and/or test data may be used each time.

Figure 7:
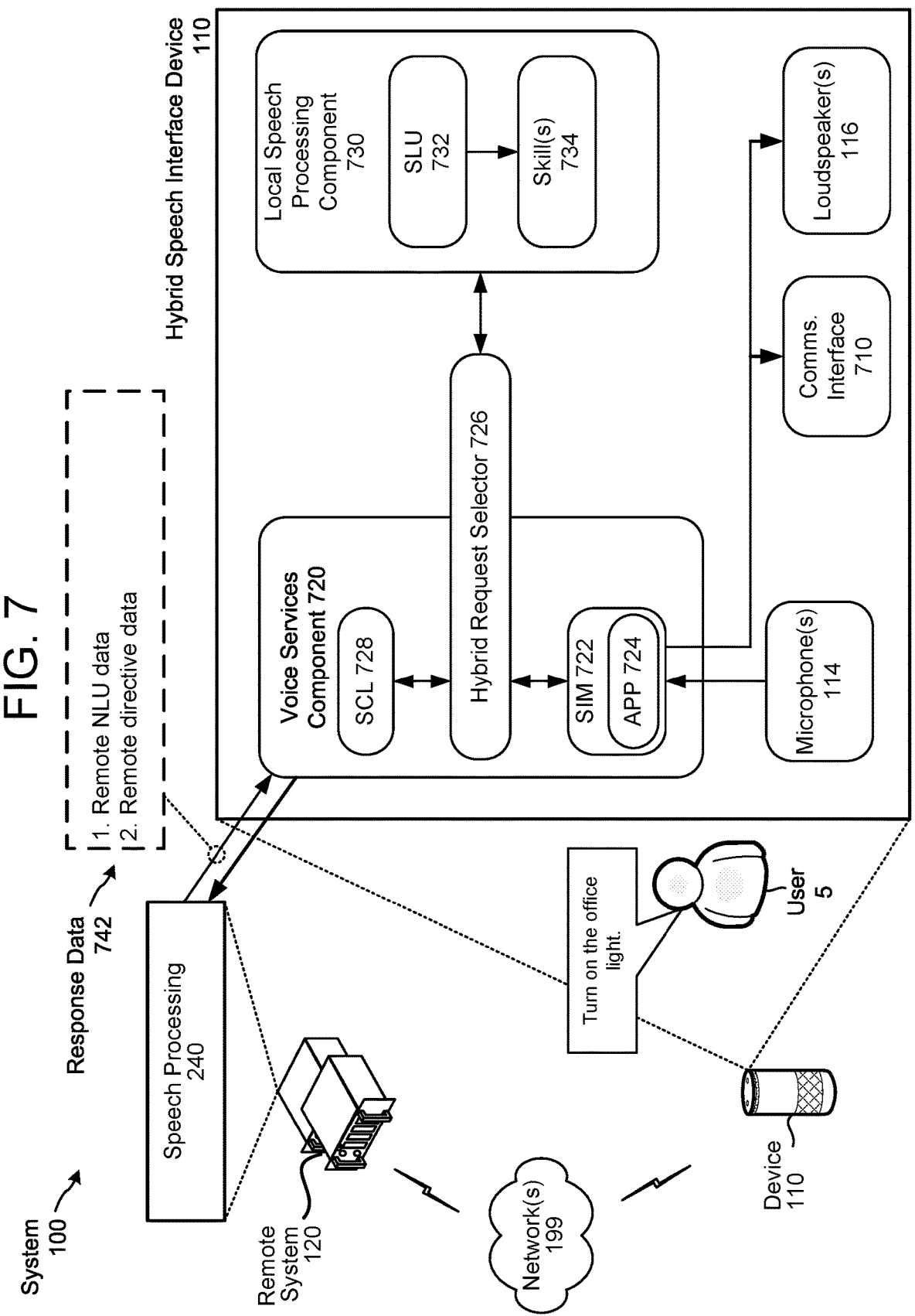
FIG. 7 is a block diagram illustrating a system including a hybrid speech interface device according to embodiments of the present disclosure.

FIG. 7 is a block diagram illustrating a system including a hybrid speech interface device according to embodiments of the present disclosure. As used herein, the hybrid speech interface device may be referred to as "device 110" and may indicate that the device 110 includes a local speech processing component 730, such as an SLU component described above. As the device 110 includes the local speech processing component 730, the device 110 may be configured to process audio data locally and/or send the audio data to the remote system 120 for remote processing.

The device 110 may be located within an environment to provide various capabilities to a user 5, when the user 5 is also in the environment. The environment in which the device 110 is located may be a home or other premises, an automobile, or any similar environment. Such an environment may include other devices including additional speech interface devices and/or second devices (e.g., Internet of Things (IoT) devices and/or smart home devices like thermostats, lights, refrigerators, ovens, etc.) that may be controllable by speech interface devices, such as the device 110. When acting as a hub, the device 110 may be configured to connect a plurality of devices in an environment and control communications among them, thereby serving as a place of convergence where data arrives from one or more devices, and from which data is sent to one or more devices.

In general, the device 110 may be capable of capturing utterances with microphone(s) 114, and responding in various ways, such as by outputting content (e.g., audio) via an output device(s), which may be loudspeaker(s) 116, a display(s), or any other suitable output device. In addition, the device 110 may be configured to respond to user speech by controlling second devices that are collocated in the environment with the device 110, such as by sending a command to a second device via a communications interface 710 (e.g., a short range radio), the command instructing an operation to be performed at the second device (e.g., to turn on a light in the environment). While not illustrated in FIG. 7, in addition to using the microphone(s) 114 to capture utterances as audio data, the device 110 may additionally, or alternatively, receive audio data (e.g., via the communications interface 710) from a second device in the environment, such as when the other device captures an utterance from the user 5 and sends the audio data to the device 110. This may occur in situations where the other device 18 would like to leverage the "hybrid" capabilities of the device 110.

As mentioned, under normal conditions, the device 110 may operate in conjunction with and/or under the control of a remote system 120, which may be a remote, network-based or network-accessible control system. The remote system 120 may, in some instances be part of a network-accessible computing platform that is maintained and accessible via network(s) 199. Network-accessible computing platforms such as this may be referred to using terms such as "on-demand computing", "software as a service (SaaS)", "platform computing", "network-accessible platform", "cloud services", "data centers", and so forth. The remote system 120 may be configured to provide particular functionality to large numbers of local (e.g., in-home, in-car, etc.) devices of different users.

In some embodiments, the remote system 120 may be configured to receive audio data from the device 110, to recognize speech corresponding to an utterance in the received audio data using a speech processing component 240 (which may be referred to as a remote speech processing system), and to perform functions in response to the recognized speech. In some embodiments, these functions involve sending directives (e.g., commands), from the remote system 120 to the device 110 to cause the device 110 to perform an action, such as output an audible response to the utterance via loudspeaker(s) 116, and/or control second devices in the environment by sending a control command via the communications interface 710. Thus, under normal conditions, when the device 110 is able to communicate with the remote system 120 over the network(s) 199, some or all of the functions capable of being performed by the remote system 120 may be performed by sending directive(s) over the network(s) 199 to the device 110, which, in turn, may process the directive(s) and perform corresponding action(s). For example, the remote system 120, using a remote directive that is included in response data 742 (e.g., a remote response), may instruct the device 110 to output an audible response (e.g., using text-to-speech (TTS)) to a user's 5 question via a loudspeaker 116 of the device 110, to output content (e.g., music) via the loudspeaker 116 of the device 110, to display content on a display of the device 110, and/or to send a directive to a nearby device (e.g., directive to turn on a light). It is to be appreciated that the remote system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

A home automation example is shown in FIG. 7 by the user 5 uttering the expression "Turn on the office light." Whether this utterance is captured by the microphone(s) 114 of the device 110 or captured by another device (e.g., speech interface device without a local speech processing component) in the environment, the audio data representing the utterance is ultimately received by a speech interaction manager (SIM) 722 of a voice services component 720 executing on the device 110. The SIM 722 may manage received audio data by processing utterances as events, and the SIM 722 may also manage the processing of directives that are used to respond to the user speech (e.g., by controlling the action(s) of the device 110). The SIM 722 may include one or more client applications 724 or skills for performing various functions at the device 110.

A hybrid request selector 726 (e.g., hybrid request selector component) is illustrated in FIG. 7 as a component of the device 110. At least part of (e.g., subcomponents of) the hybrid request selector 726 can be implemented as a layer within the voice services component 720 that is located between the SIM 722 and a speech communication library (SCL) 728, and may be configured to proxy traffic to/from the remote system 120. For example, the hybrid request selector 726 may be configured to pass messages between the SIM 722 and the SCL 728 (such as by passing events and directives there between), and to send messages to/from subcomponents of the hybrid request selector 726 that are configured to select a response (e.g., either local or remote response data) to use in responding to user speech. In this manner, the hybrid request selector 726 can "snoop" on communication between the SIM 722 and the remote system 120. For instance, information (e.g., a remote directive, remote NLU data, etc.) that is contained in the response data 742 can be sent to the hybrid request selector 726. The hybrid request selector 726 may also be configured to allow audio data received from the SIM 722 to pass through to the remote system 120 (via the SCL 728) while also receiving (e.g., intercepting) this audio data for input to a local speech processing component 730.

The local speech processing component 730 is configured to process audio data representing user speech. In some embodiments, the hybrid request selector 726 may further control the execution of the local speech processing component 730, such as by sending "execute" and "terminate" events/directives to the local speech processing component 730. An "execute" event may instruct the local speech processing component 730 to continue any suspended execution based on audio data (e.g., by instructing the local speech processing component 730 to execute on a previously-determined intent in order to generate a directive). Meanwhile, a "terminate" event may instruct the local speech processing component 730 to terminate further execution based on the audio data, such as when the device 110 receives directive data from the remote system 120 and chooses to use that remotely-generated directive data.

In the example of FIG. 7, where the user 5 utters the expression "Turn on the office light," the audio data is received by the SIM 722 of the voice services component 720. The SIM 722 may send the audio data through the hybrid request selector 726, which allows the audio data to pass through to the SCL 728, and the SCL 728, in turn, sends the audio data over the network(s) 199 to the remote system 120 for processing speech remotely. The network(s) 199 is representative of any type of public or private, wide-area network, such as the Internet, which extends beyond the environment of the device 110. Thus, the network(s) 199 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The remote system 120 may process the audio data using a speech processing component 240, which is discussed above with regard to FIGS. 2-4, to generate remote NLU data and/or corresponding remote directive data. For example, the remote NLU data may correspond to intent data and/or slot data that represent an intent associated with the utterance, and the remote directive data may include a directive that corresponds to the intent. In a conventional system, the remote system 120 may use the remote NLU data locally to determine the remote directive data and may only send the remote directive data to the device 110.

To enable on-device learning for the device 110, however, the remote system 100 may instead send response data 742 that includes both the remote directive data and the remote NLU data. In response to receiving the response data 742, the device 110 may perform one or more action(s) corresponding to the remote directive data and store the remote NLU data for a later training process. For example, the device 110 may analyze the remote NLU data and local NLU data corresponding to the same utterance and may modify an SLU model based on the analysis.

In some examples, the device 110 and/or the remote system 120 may associate a unique identifier with each utterance. Thus, the device 110 may include the unique identifier when sending the audio data to the remote system 120 and the response data 742 may include the unique identifier to identify which utterance the remote directive data and the remote NLU data corresponds.

In addition to sending the audio data to the remote system 120, the hybrid request selector 726 may also send the audio data to the local speech processing component 730. At this point, the hybrid request selector 726 may wait for response data from either or both of the remote system 120 or the local speech processing component 730.

The local speech processing component 730 is configured to receive the audio data from the hybrid request selector 726 as input, to recognize speech in the audio data, to determine local NLU data corresponding to user intent from the recognized speech, and to determine how to act on the local NLU data by generating local directive data. The local directive data may include a directive, and in some cases, the directive may include a description of the intent (e.g., an intent to turn on {device A}). In some cases, the directive may include (e.g., encode) an identifier of a second device, such as the office light, and an operation to be performed at the second device. While the example described above refers to sending a directive to a second device (e.g., the office light), the disclosure is not limited thereto and the device 110 may execute the directive without departing from the disclosure.

In some examples, the device 110 may be configured to compare the audio data to stored models used to detect a wakeword that indicates to the device 110 that the audio data is to be processed for determining an intent (a local NLU result). In some examples, the hybrid request selector 726 may send the audio data to the local speech processing component 730 to have the local speech processing component 730 determine whether a wakeword is detected in the audio data, and, if a wakeword is detected, this indication may be provided to the hybrid request selector 726 so that the hybrid request selector 726 can proceed with routing the audio data to the remote system 120 while the local speech processing component 730 continues processing the audio data in parallel. If the local speech processing component 730 does not detect a wakeword in the audio data, this indication may be provided to the hybrid request selector 726 so that the hybrid request selector 726 can refrain from sending the audio data to the remote system 120, and the local speech processing component 730 may halt further operations after determining that the audio data does not include the wakeword. The audio data can be discarded in this situation.

Among other logical and physical components, the local speech processing component 730 may include a spoken language understanding (SLU) component 732 that may process the audio data to determine the local NLU data. The local NLU data may include intent data and/or slot data (e.g., "NLU result") so that directives may be determined based on the intent data and/or the slot data. The SLU component 732 may include one or more SLU models that perform SLU, as discussed above. For ease of illustration, the disclosure may refer to modifying or updating a single SLU model, such as replacing a "first SLU model" with a "second SLU model," but the disclosure is not limited thereto. Instead, modifying or updating the SLU model may correspond to modifying or updating the one or more SLU models without departing from the disclosure. For example, the device 110 may update all of the SLU models, a portion of the SLU models, or a single SLU model without departing from the disclosure.

While the SLU component may be equivalent to a combination of an automatic speech recognition (ASR) component and a natural language understanding (NLU) component, the SLU component may process the audio data and directly generate the NLU data, without an intermediate step of generating text data. Thus, the SLU component 732 takes audio data input and attempts to make a semantic interpretation of the utterance represented by the audio data. That is, the SLU component 732 determines a meaning associated with the utterance and then implements that meaning. For example, the SLU component 732 may interpret audio data representing an utterance from the user 5 in order to derive an intent or a desired action or operation from the user 5. This may include deriving pertinent pieces of information from the utterance that allow the SLU component 732 to identify a second device in the environment, if the user, for example, intends to control a second device (e.g., a light in the user's 5 house, as is the case in the example of FIG. 7). The local speech processing component 730 may also provide a dialog management function to engage in speech dialogue with the user 5 to determine (e.g., clarify) user intents by asking the user 5 for information using speech prompts.

In some examples, the SLU component 732 outputs the most likely NLU response (e.g., hypothesis) recognized in the audio data, or multiple hypotheses in the form of a lattice or an N-best list with individual hypotheses corresponding to confidence scores or other scores (such as probability scores, etc.). In some examples, the SLU component 732 is customized to the user 5 (or multiple users) who created a user account to which the device 110 is registered. For instance, the SLU models (and other data) used by the SLU component 732 may be based on known information (e.g., preferences) of the user 5, and/or on a history of previous interactions with the user 5.

The local speech processing component 730 may also include, or be configured to use, one or more installed skill(s) 734 (e.g., speechlet(s)). Skill(s) 734 may represent domains that are used in order to determine how to act on an utterance in a particular way, such as by outputting a directive that corresponds to the determined intent, and which can be processed to implement the desired operation. Accordingly, the term "skill" may be used interchangeably with the terms "speechlet," "domain," or "domain implementation." The skill(s) 734 installed on the device 110 may include, without limitation, a music skill 734a (or music domain) to act on utterances with intents to play music on a device, such as via loudspeaker(s) 116 of the device 110, a navigation skill 734b (or a navigation domain) to act on utterances with intents to get directions to a point of interest with a known address, a shopping skill 734 (or shopping domain) to act on utterances with intents to buy an item from an electronic marketplace, and/or a device control skill 734c (or device control domain) to act on utterances with intents to control a second device(s) in the environment.

In order to generate a particular interpreted response, the SLU component 732 may apply grammar models and lexical information associated with the respective domains or skill(s) 734 to recognize one or more entities in the utterance. In this manner the SLU component 732 may identify "slots" (i.e., particular words in the utterance) that may be needed for later command processing. Depending on the complexity of the SLU component 732, it may also label each slot with a type of varying levels of specificity (such as noun, place, city, artist name, song name, device name, or the like). Each grammar model used by the SLU component 732 may include the names of entities (i.e., nouns) commonly found in speech about the particular domain (i.e., generic terms), whereas the lexical information (e.g., from a gazetteer) is personalized to the user(s) and/or the device. For instance, a grammar model associated with the navigation domain may include a database of words commonly used when people discuss navigation.

Accordingly, the intents identified by the SLU component 732 may be linked to domain-specific grammar frameworks with "slots" or "fields" to be filled (e.g., resolved). Each slot/field corresponds to a portion of the query text that the system believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the SLU component 732 may parse the utterance to identify words as subject, object, verb, preposition, etc., based on grammar rules and/or models, prior to recognizing named entities. The identified verb may be used by the SLU component 732 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The SLU component 732 may then search the corresponding fields in the domain-specific and personalized lexicon(s), attempting to match words and phrases in the utterance tagged as a grammatical object or object modifier with those identified in the database(s).

After determining a local NLU result, or failing to do so, the local speech processing component 730 may send local response data (e.g., local NLU result and/or local directive data) to the hybrid request selector 726, such as a "ReadyToExecute" response, which indicates that the local speech processing component 730 has recognized an intent, or is ready to communicate failure (if the local speech processing component 730 could not recognize an intent via the SLU component 732). The hybrid request selector 726 may then determine whether to use the local directive data from the local speech processing component 730 to respond to the utterance, or whether to use remote directive data received from the remote system 120, assuming response data 742 is even received (e.g., when the device 110 is able to access the remote system 120 over the network(s) 199).

The local speech processing component 730 may also store local NLU data, local directive data, a unique identifier associated with the utterance, and/or the like (collectively, "local training data") for later training. If the local speech processing component 730 performs the training, the local speech processing component 730 may also receive the remote NLU data, the remote directive data, and/or the unique identifier included in the response data 742 (collectively, "remote training data") from the hybrid request selector 726. Thus, the local speech processing component 730 may store the local training data and the remote training data for later training. During a training process, the local speech processing component 730 may use the unique identifier to locate the local NLU data and the remote NLU data and may train the SLU component 732 (e.g., modify an SLU model associated with the SLU component 732) based on the local NLU data and the remote NLU data.

Additionally or alternatively, the local speech processing component 730 may send the local training data to another component within the device 110 and/or the remote system 120 for later training. For example, a component within the device 110 other than the local speech processing component 730 may store the local training data and the remote training data. In some examples, the local training data and the remote training data may be input to the local speech processing component 730 for training, although the disclosure is not limited thereto and another component within the device 110 may perform the training process and may input a modified SLU model to the local speech processing component 730. Additionally or alternatively, the device 110 may send the local training data to the remote system 120 and the remote system 120 may update the SLU model based on the local training data.

As will be described in greater detail below, the device 110 may perform a training process to update the SLU model based on various inputs, including user feedback (e.g., direct feedback and/or feedback inferred based on subsequent responses), remote feedback from the remote system 120, and/or the like. As used herein, on-device training corresponds to any modification of the SLU model performed by the device 110, whether based on user feedback, remote feedback, or any other input to the device 110. For example, the device 110 may modify the SLU model itself, may modify weights associated with the SLU model, and/or the like based on a feedback process.

As used herein, a subset of on-device training may be referred to as "supervised" on-device learning, which occurs when the device 110 modifies the SLU model based on input from the remote system 120. In some examples, supervised on-device learning corresponds to analyzing the local NLU data and the remote NLU data to determine specific instances in which the SLU component 742 generated local NLU results that differed from the remote NLU results. As a result, the device 110 may modify the SLU model to decrease a likelihood of generating the local NLU results and/or increase a likelihood of generating the remote NLU results in the future. For example, the device 110 may modify the SLU model itself, may modify weights associated with the SLU model, and/or the like. In other examples, supervised on-device learning may also correspond to analyzing the local NLU data and the remote NLU data to determine specific instances in which the SLU component 742 generated local NLU results that was identical to the remote NLU results. As a result, the device 110 may modify the SLU model to increase a likelihood of generating the local NLU results in the future, such as increasing individual confidence score(s) and/or weight(s) associated with the SLU model.

In the examples given above of analyzing the local NLU data and the remote NLU data, the device 110 may only perform "supervised" training in instances when the response data 742 is received from the remote system 120. Thus, when the device 110 is in a connected condition and receiving data from the remote system 120, the device 110 may possess the local NLU result(s), the local directive data, the unique identifier associated with the utterance, and/or the like (e.g., local training data), as well as information extracted from the response data 742, which may include at least: the remote NLU data (e.g., one or more remote NLU results), the remote directive data (e.g., one or more directives), the unique identifier associated with the utterance, and/or the like.

If the device 110 is not in the connected condition, the device 110 may not receive the response data 742 from the remote system 120 during runtime (e.g., prior to performing an action associated with the utterance). In some examples, the device 110 may store the audio data, the local NLU data, the local directive data, the unique identifier, and/or the like as local test data for subsequent training. The device 110 may store local test data corresponding to a number of utterances before performing subsequent training. Thus, at a later point in time when the device 110 is in communication with the remote system 120, the device 110 may send the audio data associated with a number of utterances to the remote system 120. For example, the device 110 may send the audio data to the remote system 120, may receive the response data 742 including remote NLU data for each of the utterances included in the audio data, and may perform a training process based on the response data 742.

In some examples, the device 110 may store test data for every utterance processed by the local speech component 730. In other examples, however, the device 110 may store test data only for particular utterances processed by the local speech component 730. For example, the device 110 may only store test data for a subset of the utterances, which may be selected based on complexity, a confidence score associated with the local NLU data being below a threshold value, multiple similar confidence scores, and/or any other technique known to one of skill in the art. Thus, the device 110 may selectively generate test data and only require subsequent training for the individual utterances for which the local NLU data may be incorrect.

Figure 8A:
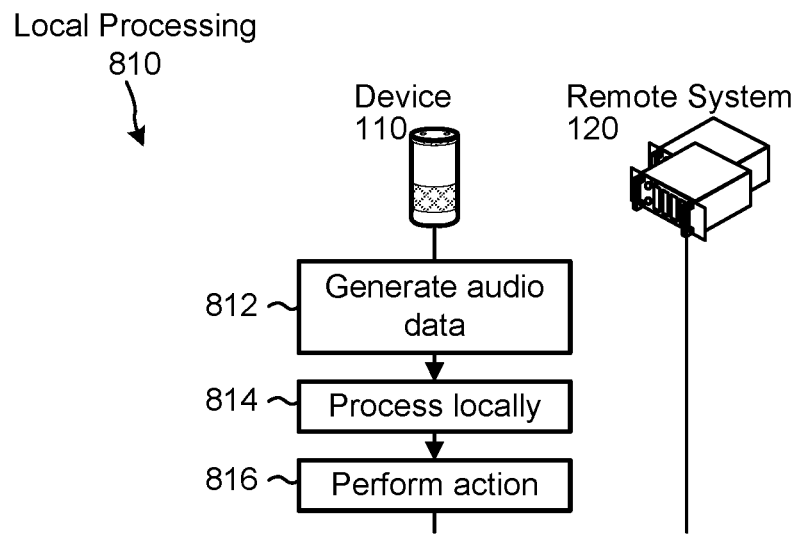
FIGS. 8A-8E illustrate examples of different ways that the hybrid speech interface device may process an utterance according to embodiments of the present disclosure.

FIGS. 8A-8E illustrate examples of different ways that the hybrid speech interface device may process an utterance according to embodiments of the present disclosure. As illustrated in FIG. 8A, local processing 810 occurs when the device 110 processes audio data locally, such as by using the local speech processing component 730. For example, the device 110 may generate (812) audio data including a representation of an utterance, may process (814) the audio data locally using the local speech processing component 730, and may perform (816) an action corresponding to the utterance. As the remote system 120 is not used, local processing 810 may be performed when there is no connection with the remote system 120.

Figure 8B:
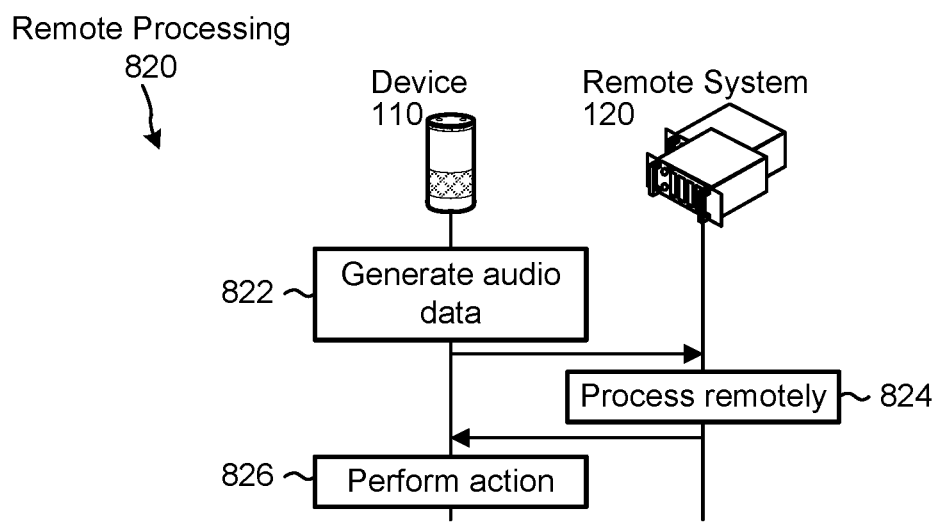

As illustrated in FIG. 8B, remote processing 820 occurs when the device 110 sends the audio data to the remote system 120 for remote processing. For example, the device 110 may generate (822) audio data including a representation of an utterance, may process (824) the audio data remotely by sending the audio data to the remote system 120 and receiving response data from the remote system 120, and may perform (826) an action corresponding to the utterance.

Figure 8C:
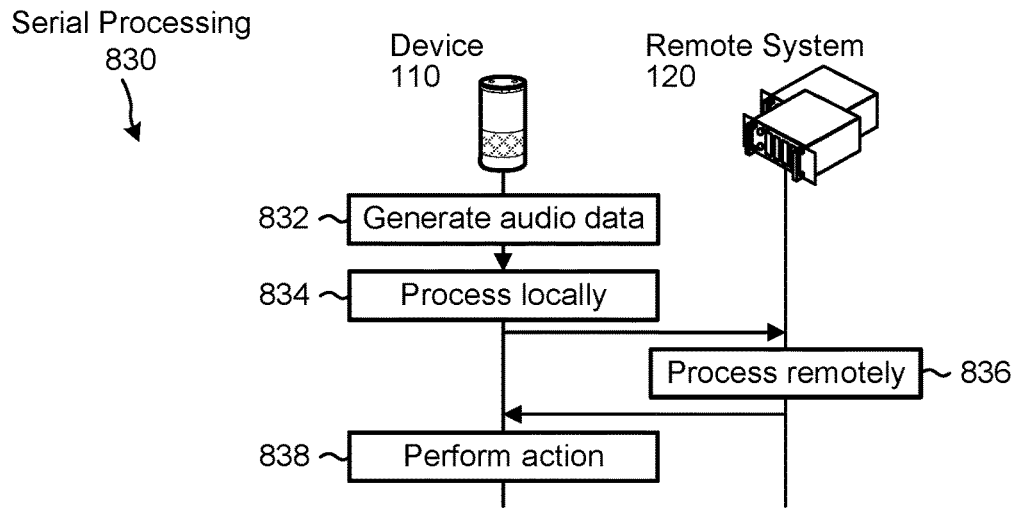

As illustrated in FIG. 8C, serial processing 830 occurs when the device 110 attempts to process the audio data locally but then sends the audio data to the remote system 120 for processing. For example, the device 110 may generate (832) audio data including a representation of an utterance and may process (834) the audio data locally using the local speech processing component 730. Due to a variety of reasons, such as a low confidence score associated with the NLU data, a number of similar confidence scores associated with the NLU data, and/or the like, the device 110 may determine to send the audio data to the remote system 120 for remote processing. Thus, the device 110 may process (836) the audio data remotely by sending the audio data to the remote system 120 and receiving response data from the remote system 120, and may perform (838) an action corresponding to the utterance.

Figure 8D:
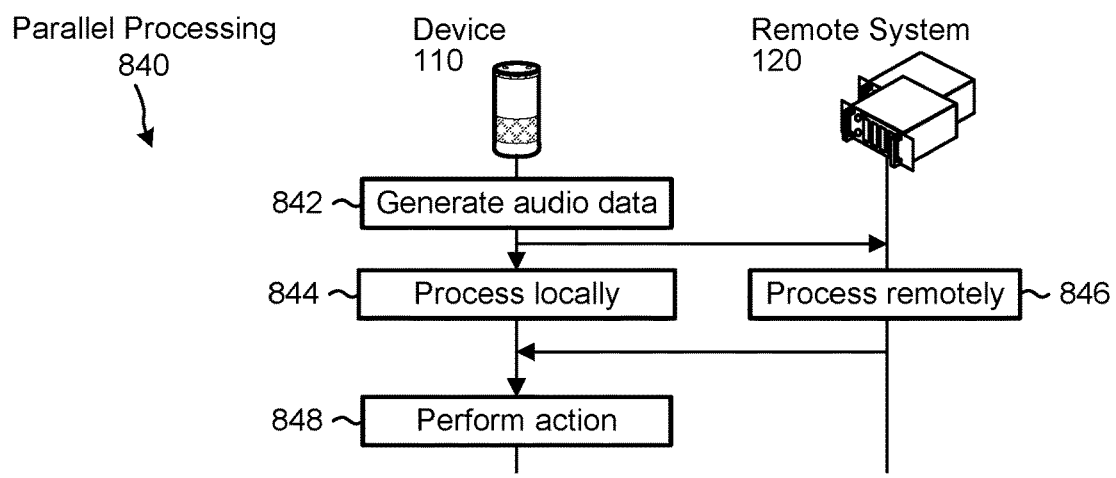

As illustrated in FIG. 8D, parallel processing 840 occurs when the device 110 attempts to process the audio data locally while also sending the audio data to the remote system 120 for remote processing. For example, the device 110 may generate (842) audio data including a representation of an utterance, may process (844) the audio data locally using the local speech processing component 730, may process (846) the audio data remotely by sending the audio data to the remote system 120 and receiving response data from the remote system 120, and may perform (848) an action corresponding to the utterance. Thus, the device 110 may select between the local NLU data and/or the remote NLU data to perform the action. For example, the device 110 may select the remote NLU data when the remote NLU data is received within a period of time, but may select the local NLU data otherwise to decrease a delay between the device 110 generating the audio data and performing the action.

Figure 8E:
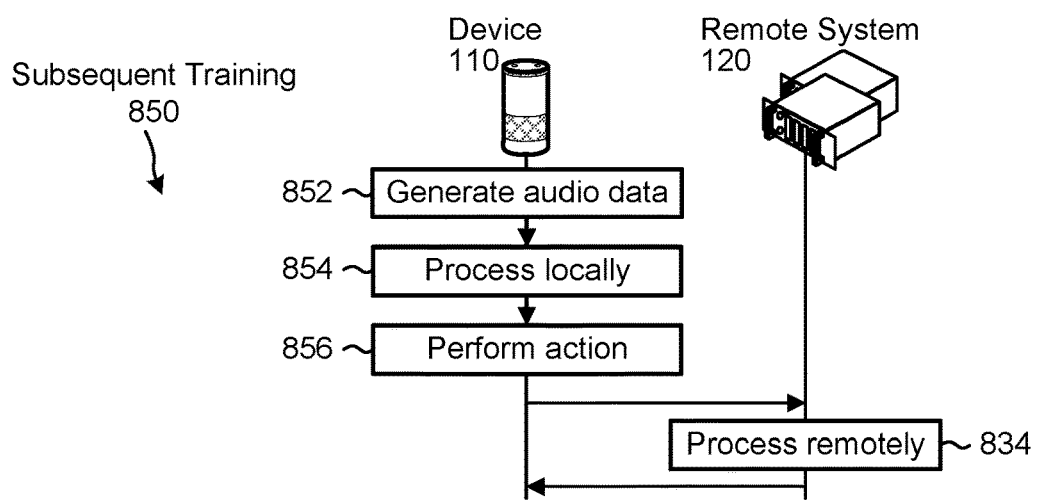

As illustrated in FIG. 8E, subsequent training 850 occurs when the device 110 processes the audio data locally while also sending the audio data to the remote system 120 for remote processing at a later point in time. For example, the device 110 may generate (852) audio data including a representation of an utterance, may process (854) the audio data locally using the local speech processing component 730, and may perform (856) an action corresponding to the utterance based on the local NLU data. However, at a later point in time the device 110 may process (858) the audio data remotely by sending the audio data to the remote system 120 and receiving response data from the remote system 120. For example, the device 110 may store the audio data and corresponding local NLU data and may analyze the remote NLU data and the local NLU data to train the SLU model.

While not illustrated in FIG. 8E, the device 110 may selectively store test data for subsequent training 850. In some examples, the device 110 may store test data for every utterance processed by the local speech component 730. In other examples, however, the device 110 may store test data only for particular utterances processed by the local speech component 730. For example, the device 110 may only store test data for a subset of the utterances, which may be selected based on complexity, a confidence score associated with the local NLU data being below a threshold value, and/or any other technique known to one of skill in the art. Thus, the device 110 may selectively generate test data and only require subsequent training for the individual utterances for which the local NLU data may be incorrect.

Figure 9A:
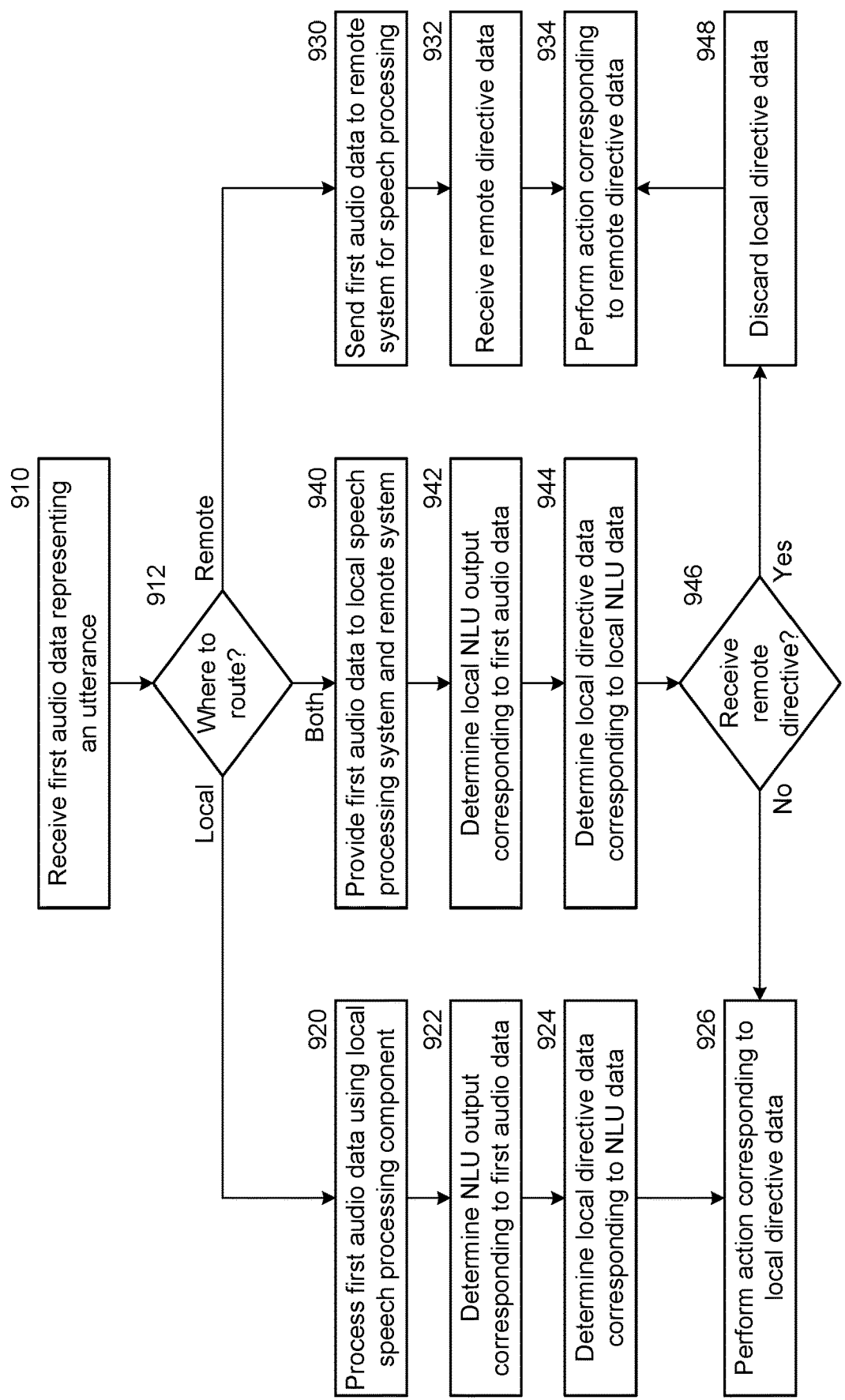
FIGS. 9A-9B are flowcharts conceptually illustrating example methods for determining how the hybrid speech interface device will process an utterance according to embodiments of the present disclosure.
Figure 9B:
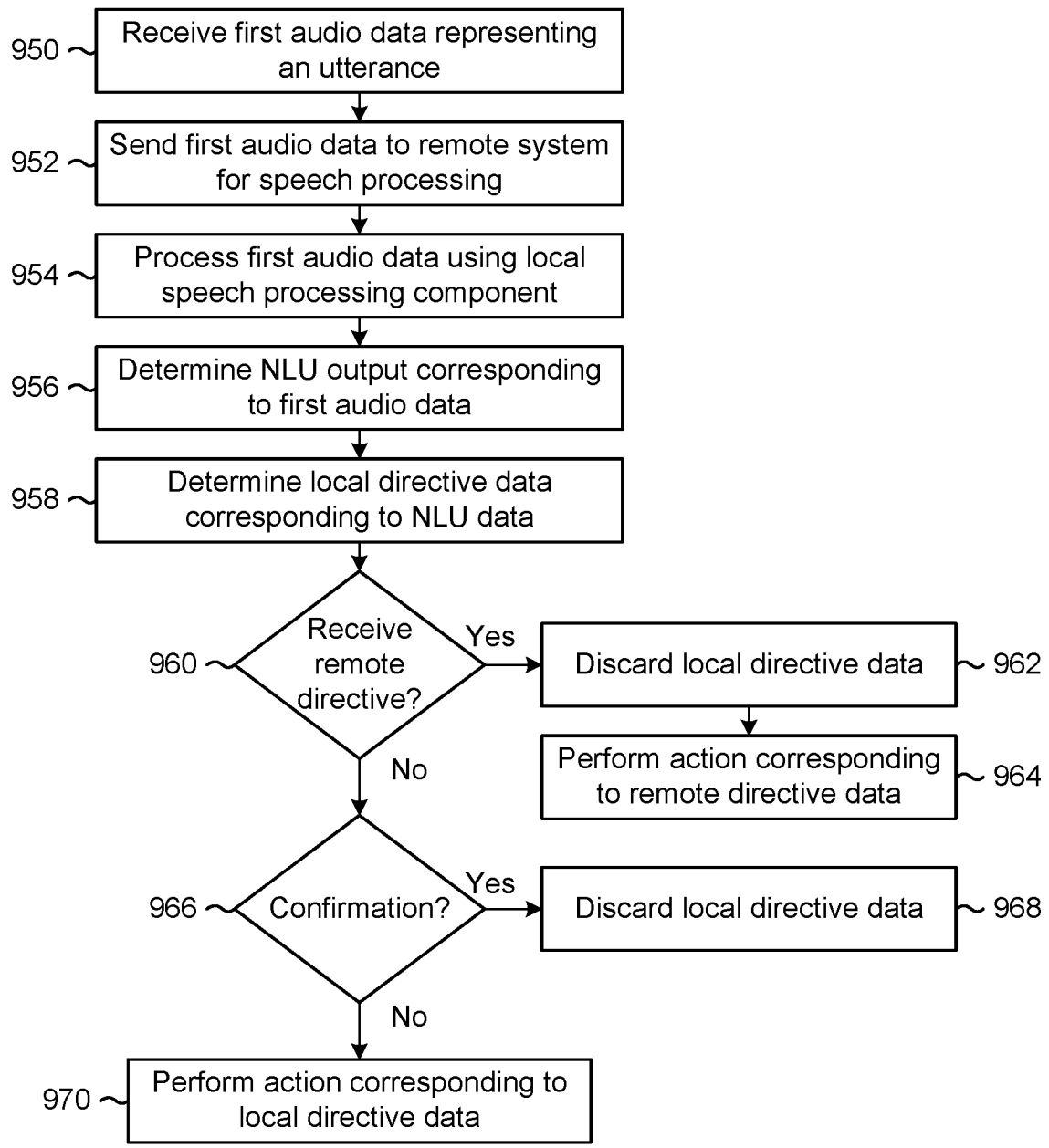

FIGS. 9A-9B are flowcharts conceptually illustrating example methods for determining how the hybrid speech interface device will process an utterance according to embodiments of the present disclosure. As illustrated in FIG. 9A, the device 110 may receive (910) first audio data representing an utterance and may determine (912) where to route the first audio data. For example, the device 110 may determine to route the first audio data locally, in which case the device 110 may process (920) the first audio data using a local speech processing component, may determine (922) NLU output data corresponding to the first audio data, may determine (924) local directive data corresponding to the NLU data, and may perform (926) an action corresponding to the local directive data.

In some examples, in step 912 the device 110 may determine to route the first audio data remotely, in which case the device 110 may send (930) the first audio data to a remote system for speech processing, may receive (932) remote directive data, and may perform (934) an action corresponding to the remote directive data.

In other examples, in step 912 the device 110 may determine to route the first audio data both locally and remotely, and may provide (940) the first audio data to the local speech processing system and the remote speech processing system, may determine (942) the local NLU output data corresponding to the first audio data, determine (944) the local directive data corresponding to the local NLU data, and may determine (946) whether a remote directive has been received. If the remote directive has not been received within a period of time, the device 110 may loop to step 926 and perform the action corresponding to the local directive data. If the remote directive is received within the period of time, however, the device 110 may discard (948) the local directive data and loop to 934 to perform the action corresponding to the remote directive data.

FIG. 9B illustrates an example of parallel processing in more detail. As illustrated in FIG. 9B, the device 110 may receive (950) first audio data representing an utterance and may send (952) the first audio data to the remote system for speech processing. In addition, the device 110 may process (954) the first audio data using a local speech processing component, may determine (956) NLU output data corresponding to the first audio data, and may determine (958) local directive data corresponding to the NLU data.

The device 110 may determine (960) whether a remote directive has been received from the remote system for a duration of time. If the remote directive is received, the device 110 may discard (962) the local directive data and perform (964) an action corresponding to the remote directive data received from the remote system. If the remote directive is not received within the duration of time, the device 110 may determine (966) whether a confirmation has been received from the remote system, and if so, may discard (968) the local directive data without performing an action. For example, the utterance may correspond to an action that is performed on the remote system, and the remote system may send the confirmation to the device 110 notifying the device 110 that the utterance has been resolved. If the device 110 determines that the remote directive is not received in step 960 and the confirmation is not received in step 966, the device 110 may perform (970) an action corresponding to the local directive data.

Figure 10A:
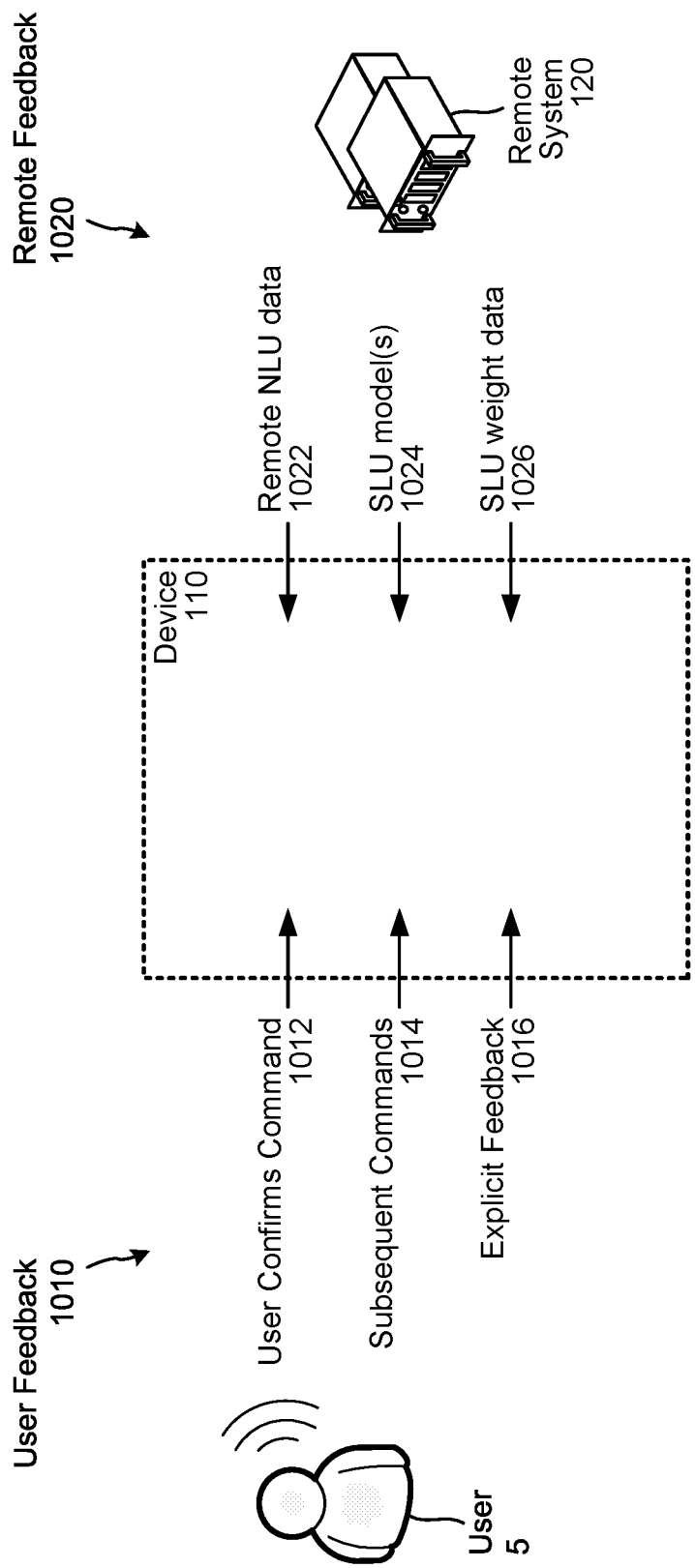
FIGS. 10A-10B illustrate examples of on-device learning and modifying an SLU model based on feedback from a user or a remote system according to embodiments of the present disclosure.
Figure 10B:
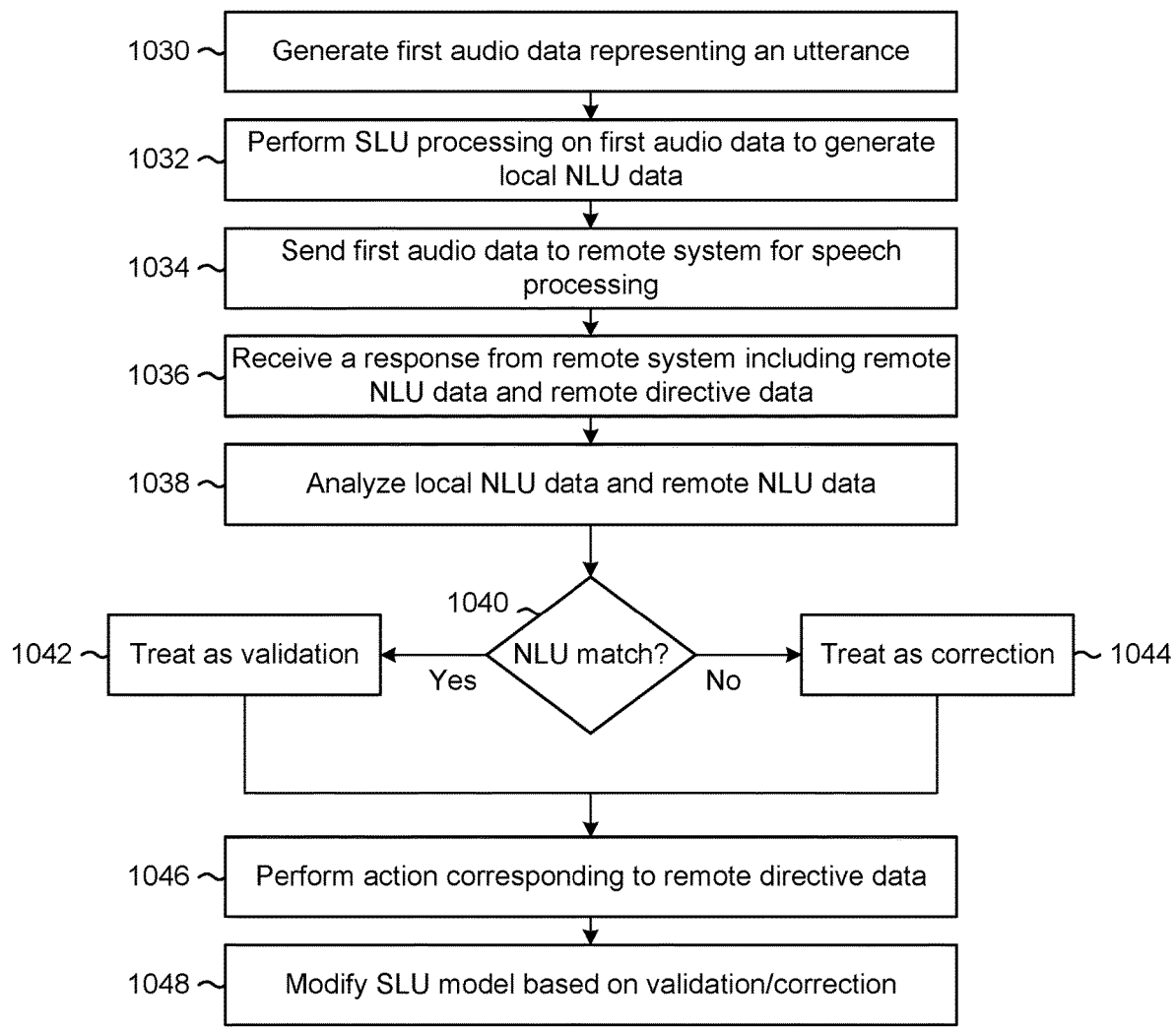

FIGS. 10A-10B illustrate examples of on-device learning and modifying an SLU model based on feedback from a user or a remote system according to embodiments of the present disclosure. As illustrated in FIG. 10A, the device 110 may device user feedback 1010 from the user 5 as well as remote feedback 1020 from the remote system 120.

Examples of user feedback 1010 include when the user 5 confirms a command 1012, subsequent commands 1014, explicit feedback 1016, and/or the like. An example of the user confirming a command 1012 occurs when the device 110 performs disambiguation to select between two or more potential commands. For example, the device 110 may initiate a dialog with the user 5 requesting that the user 5 confirm the appropriate command to perform. In addition, the device 110 may infer user feedback from subsequent commands 1014 without explicit confirmation. For example, when subsequent commands 1014 are similar to the original command, the device 110 may infer that the original command was not exactly what the user intended, whereas when subsequent commands 1014 modify the original command, the device 110 may infer that the original command was correct and/or acquire additional information about what the original command was requesting. Additionally or alternatively, the device 110 may infer feedback from subsequent commands 1014, such as based on a volume level, frequency of speech, and/or any other information that may indicate an emotional state of the user or the like. In some examples, the user 5 may provide explicit feedback 1016 indicating that the original command was not accurate.

The remote feedback 1020 may include data received from the remote system 120 that may be used by the device 110 to improve processing, such as by training the SLU model used by the device 110 to perform speech processing. For example, the remote feedback 1020 may include remote NLU data 1022, SLU model(s) 1024, SLU weight data 1026, and/or the like. The remote NLU data 1022 is described in greater detail above with regard to FIG. 7, and corresponds to examples of training the SLU model by analyzing the local NLU data and the remote NLU data. For example, this supervised training may occur after serial processing 830 (e.g., remote system 120 processes an utterance after the device 110 tried and failed to process the utterance), after parallel processing 840 (e.g., the device 110 processes an utterance locally while also sending the utterance to the remote system 120 for processing), and/or subsequent training 850 (e.g., the device 110 processes an utterance locally during runtime processing and stores test data, which is sent to the remote system 120 at a later point in time).

The SLU model(s) 1024 corresponds to data that may be used by the device 110 to configure an entire SLU model for local processing. For example, the remote system 120 may generate an SLU model 1024 based on aggregated weights received from a plurality of devices 110, may send the SLU model 1024 to the device 110, and the device 110 may replace a current SLU model with the SLU model received from the device 110. Similarly, the SLU weight data 1026 may correspond to weight values associated with the SLU model. Thus, the remote system 120 may generate the SLU model 1024, determine the weight data 1026, and send only the weight data 1026 to the device 110. In some examples, the device 110 may use the weight data 1026 to generate the SLU model on the device 110 (e.g., replacing existing weights). However, the disclosure is not limited thereto and in other examples, the device 110 may use the weight data 1026 to update the SLU model on the device 110 (e.g., modifying existing weights) without departing from the disclosure.

While the present disclosure provides multiple examples of the device 110 performing training based on the remote feedback 1020 (e.g., comparing the local NLU data to the remote NLU data 1022), the disclosure is not limited thereto. Instead, the device 110 may operate offline without any communication with the remote system 120 for periods of time without departing from the disclosure. While operating offline, the device 110 may perform on-device learning to modify the local SLU model based on the user feedback 1010 and/or other techniques known to one of skill in the art. Additionally or alternatively, the device 110 may store test data while offline for subsequent training. For example, the device 110 may store the test data until the device 110 operates online and communicates with the remote system 120 again, at which point the device 110 may send the test data to the remote system 120 and receive the remote NLU data 1022.

FIG. 10B illustrates an example of a flowchart conceptually illustrating an example method for analyzing the local NLU data and the remote NLU data and modifying the SLU model. Using the steps illustrated in FIG. 10B, the device 110 may analyze the local NLU data and the remote NLU data (e.g., compare the local NLU data to the remote NLU data) to determine whether the remote system 120 validates the local speech processing component (e.g., verifies that the local NLU data is accurate) or corrects the local speech processing component (e.g., indicates that the local NLU data is inaccurate). Based on the validations and the corrections, the device 110 may modify the SLU model accordingly. As used herein, analyzing the local NLU data and the remote NLU data may correspond to an evaluation or comparison process that may identify portions of the local NLU data that exactly match the remote NLU data, portions of the local NLU data that are similar to the remote NLU data, portions of the local NLU data that are different from the remote NLU data, and/or the like. In some examples this process may be a direct comparison, although the disclosure is not limited thereto and the device 110 may perform any technique known to one of skill in the art without departing from the disclosure.

As illustrated in FIG. 10B, the device 110 may generate (1030) first audio data representing an utterance, may perform (1032) SLU processing on the first audio data to generate local NLU data, and may send (1034) the first audio data to the remote system 120 for speech processing. The device 110 may receive (1036) a response from the remote system 120 including remote NLU data and remote directive data, may analyze (1038) the local NLU data and the remote NLU data, and may determine (1040) whether the local NLU data matches the remote NLU data. If the NLU data matches, the device 110 may treat (1042) the match as a validation of the local NLU data, which may be used to increase a confidence score associated with the local NLU data, modify weights associated with the SLU model, and/or the like. If the NLU data does not match, the device 110 may treat (1044) the lack of matching as a correction to the local NLU data, which may be used to decrease the confidence score associated with the local NLU data, modify weights associated with the SLU model, and/or the like. The device 110 may then perform (1046) an action corresponding to the remote directive data and modify (1048) the SLU model based on the validation/correction. For example, the device 110 may increase or decrease the confidence score associated with the local NLU data, the weights associated with the SLU model, and/or the like based on the analysis of the local NLU data and the remote NLU data.

While FIG. 10B illustrates that the device 110 receives the remote directive data and/or performs an action corresponding to the remote directive data, the disclosure is not limited thereto. In some examples, such as during subsequent training 850, the device 110 may perform an action corresponding to local directive data based on the local NLU data. In addition, during subsequent training 850 the device 110 may store the test data and send the test data to the remote system 120 at a later point in time. Thus, the remote system 120 may send the remote NLU data for training purposes without sending the remote directive data without departing from the disclosure.

Figure 11A:
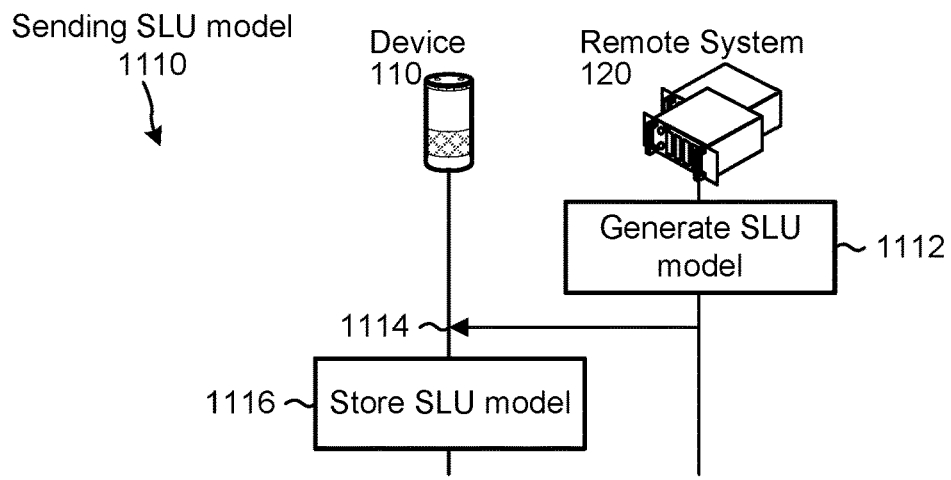
FIGS. 11A-11H illustrate examples of updating an SLU model according to embodiments of the present disclosure.

FIGS. 11A-11H illustrate examples of updating an SLU model according to embodiments of the present disclosure. As illustrated in FIG. 11A, sending an SLU model 1110 occurs when the device 110 receives a new or updated SLU model from the remote system 120. For example, the remote system 120 may generate (1112) an SLU model, may send (1114) the SLU model to the device 110, and the device 110 may store (1116) the SLU model.

Figure 11B:
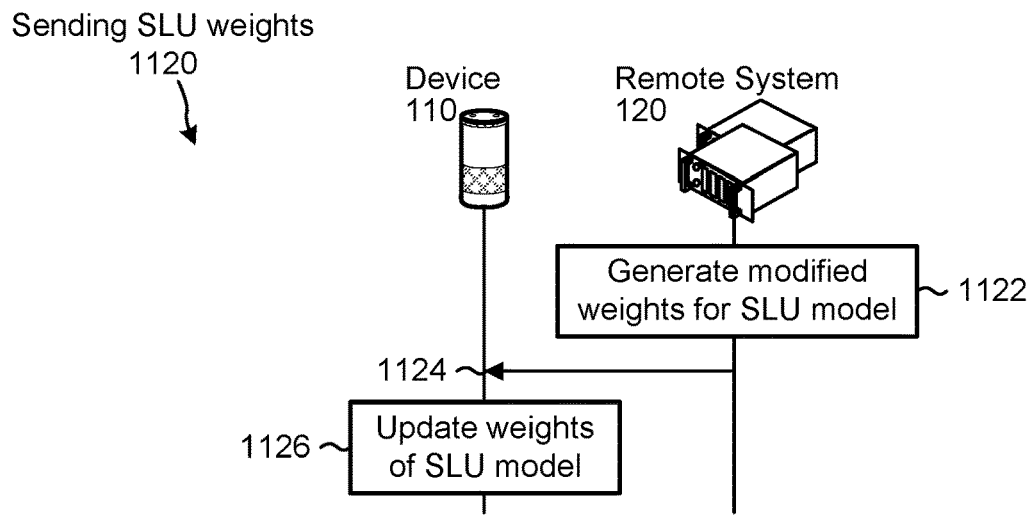

As illustrated in FIG. 11B, sending SLU weights 1120 occurs when the device 110 receives new or updated SLU weights associated with at least a portion of the SLU model from the remote system 120. For example, the remote system 120 may generate (1122) modified weights associated with the SLU model, may send (1124) the modified weights to the device 110, and the device 110 may store (1126) the modified weights. In some examples, the modified weights may correspond to an entirety of the SLU model, although the disclosure is not limited thereto and the weights may correspond to a portion of the SLU model without departing from the disclosure.

Figure 11C:
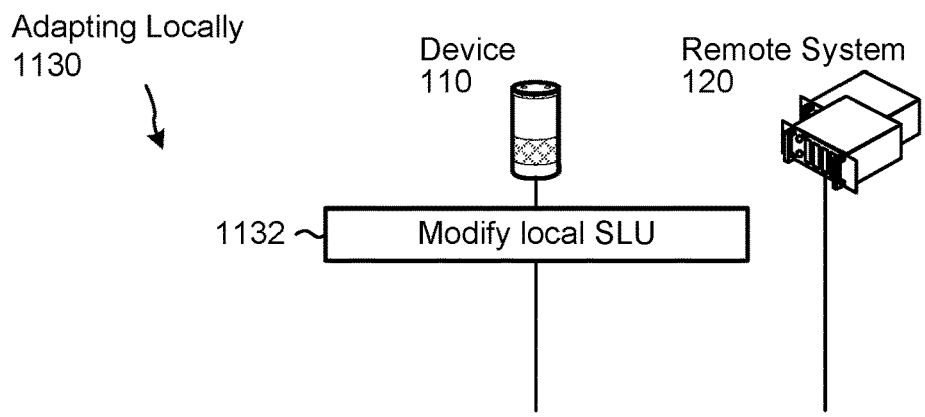

As illustrated in FIG. 11C, adapting locally 1130 occurs when the device 110 modifies weights associated with the SLU model by updating or training the SLU model. For example, the device 110 may modify (1132) the local SLU using any techniques known to one of skill in the art, such as based on user feedback 1010 and/or remote feedback 1020.

When the device 110 modifies the SLU model based on the remote feedback 1020, such as by analyzing local NLU data and remote NLU data from the remote system 120, the device 110 is typically operating in an online state (e.g., while in communication with the remote system 120). However, the disclosure is not limited thereto and the device 110 may also modify the SLU model while operating in an offline state (e.g., while not in communication with the remote system) without departing from the disclosure. For example, the device 110 may go offline for periods of time and may continue to modify the SLU model based on local feedback (e.g., user feedback 1010) and/or using any techniques known to one of skill in the art. In addition, the device 110 may store test data while offline and may perform subsequent training 850 upon reconnecting to the remote system 120 and operating in the online state.

While the device 110 may obtain feedback data (e.g., user feedback, remote feedback, etc.) during runtime processing, the device 110 may not modify the local SLU until a later point in time. For example, the device 110 may modify the local SLU during downtime when the device 110 is not interacting with the user 5 (e.g., when a processing consumption of the device 110 is below a threshold). Thus, the device 110 may prioritize training the local SLU model when there are no other tasks in a processing pipeline, and de-prioritize training when other tasks appear in the processing pipeline. For example, if the device 110 detects a wakeword corresponding to a voice command, the device 110 may cache all data associated with the training and delay the training until a following downtime. Thus, the device 110 may process the voice command and any other voice commands or inputs, determine that the processing consumption is below the threshold, retrieve the cached data and resume training the local SLU model.

Figure 11D:
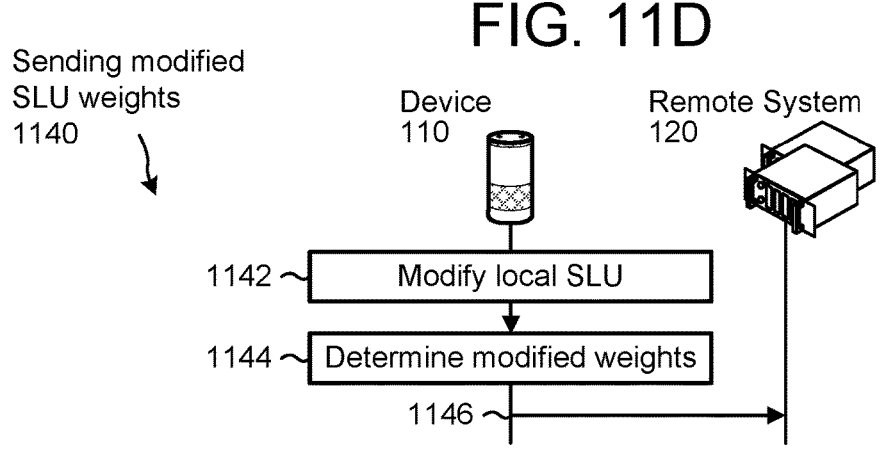

As illustrated in FIG. 11D, sending modified SLU weights 1140 occurs when the device 110 modifies weights associated with the SLU model by updating or training the SLU model. The device 110 may modify the local SLU as described in greater detail above with regard to FIG. 11C. In some examples, the device 110 may modify the SLU model based on the validations and corrections described in greater detail above with regard to FIG. 10B. However, the disclosure is not limited thereto and the device 110 may modify the SLU model based on local feedback (e.g., user feedback 1010) without departing from the disclosure.

The device 110 may then send the modified weights to the remote system 120. For example, the remote system 120 may modify (1142) the local SLU model, may determine (1144) the modified weights associated with the local SLU model, and may send (1146) the modified weights to the remote system 120. In some examples, the modified weights may correspond to an entirety of the SLU model, although the disclosure is not limited thereto and the weights may correspond to a portion of the SLU model without departing from the disclosure. For example, the device 110 may determine compressed data representing only the weights that were modified above a threshold value, which reduces a bandwidth consumption associated with sending the modified weights to the remote system 120.

Figure 11E:
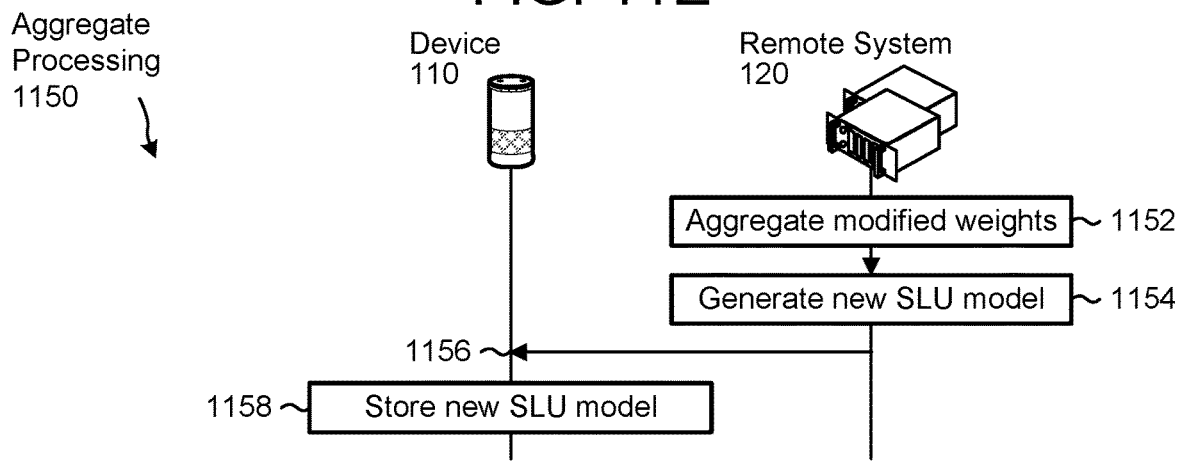

As illustrated in FIG. 11E, aggregate processing 1150 occurs when the remote system 120 aggregates modified weights received from a plurality of devices 110 to generate a new SLU model. For example, the remote system 120 may aggregate (1152) modified weights received from a plurality of devices 110, may generate (1154) a new SLU model, may send (1156) the new SLU model to the device 110, and the device 110 may store (1158) the new SLU model.

Figure 11F:
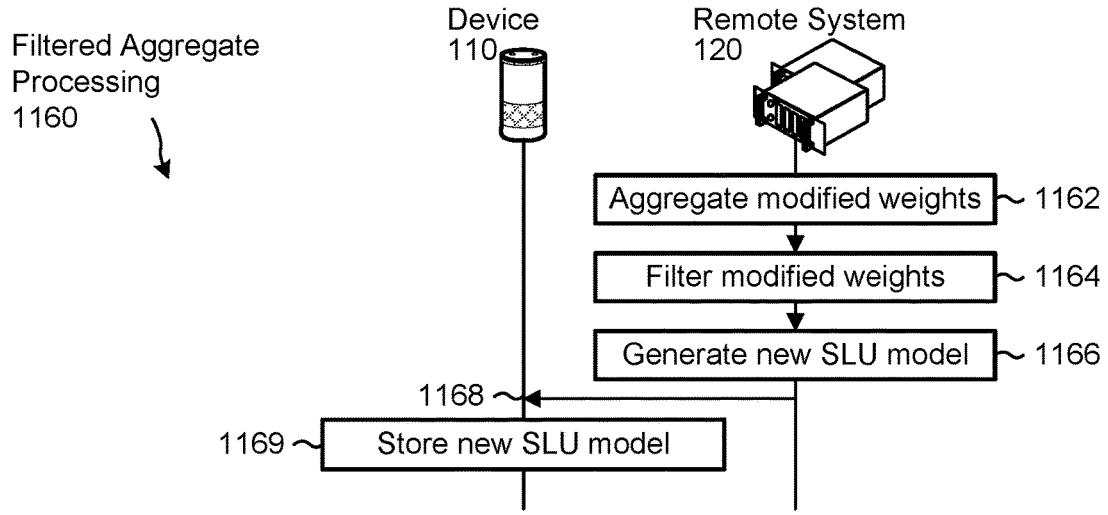

As illustrated in FIG. 11F, filtered aggregate processing 1160 occurs when the remote system 120 aggregates modified weights received from a plurality of devices 110 but then filters the modified weights prior to generating a new SLU model. For example, the remote system 120 may aggregate (1162) modified weights received from a plurality of devices 110, may filter (1164) the modified weights based on one or more parameters, may generate (1166) a new SLU model based on the filtered weights, may send (1168) the new SLU model to the device 110, and the device 110 may store (1169) the new SLU model.

Figure 11G:
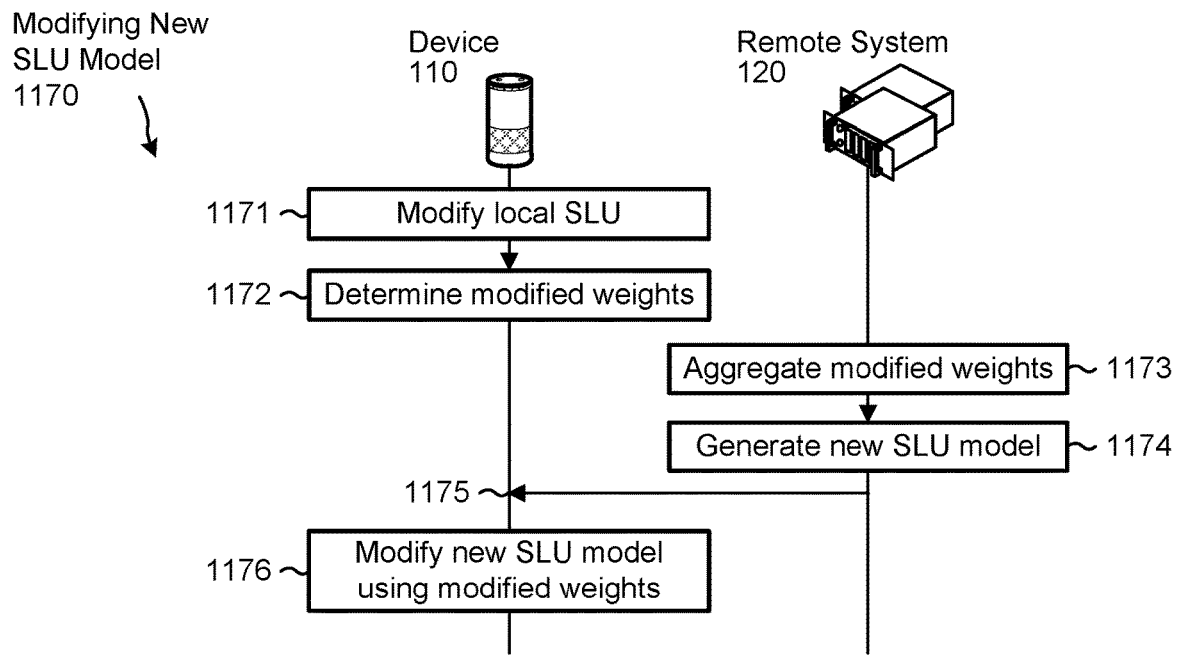

As illustrated in FIG. 11G, modifying new SLU model 1170 occurs when the device 110 receives a new SLU model and modifies the new SLU model using the modified weights of the local SLU model. For example, the device 110 may modify (1171) the local SLU model and determine (1172) modified weights associated with the modified local SLU model. The remote system 120 may aggregate (1173) modified weights received from a plurality of devices, generate (1174) a new SLU model for the device 110 based on the aggregated weights, and send the new SLU model to the device 110.

Instead of replacing the modified local SLU model that has been specifically trained based on interactions with the user 5, the device 110 may instead modify (1176) the new SLU model using the modified weights. For example, the device 110 may determine the weights that were modified based on on-device training and may modify the new SLU model with these weights to take into account the previous training.

Figure 11H:
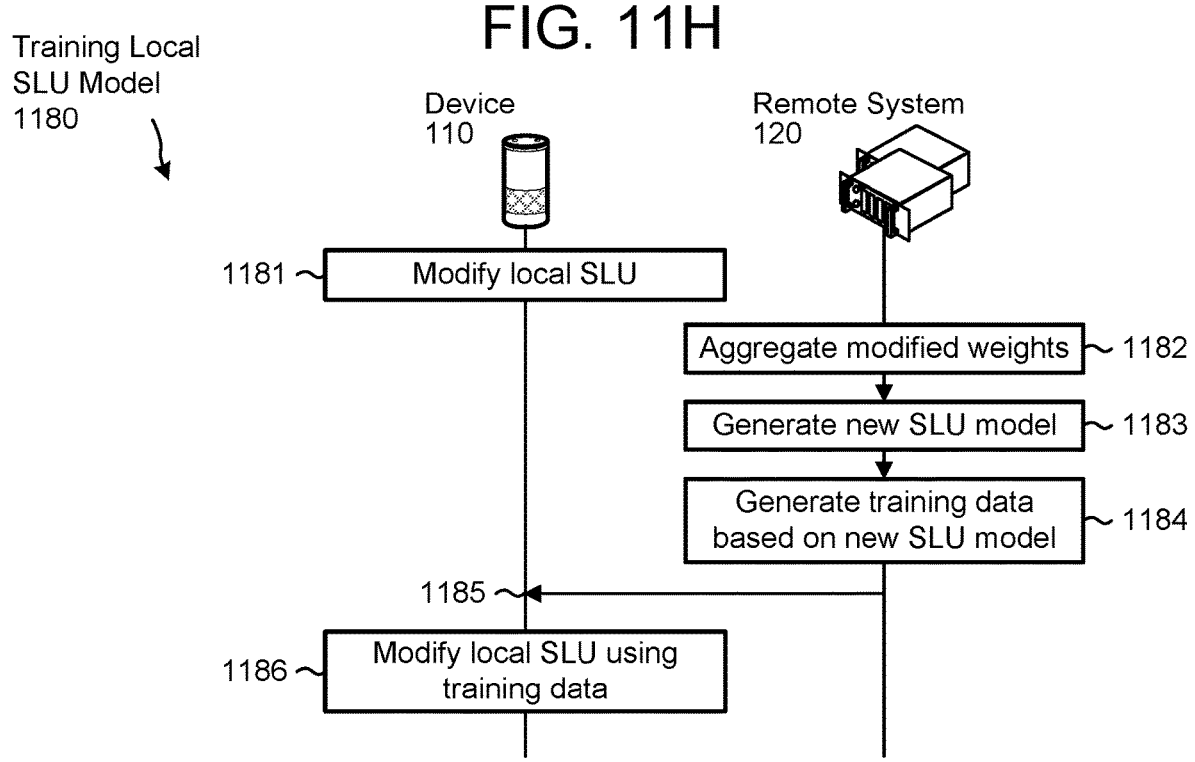

As illustrated in FIG. 11H, training local SLU model 1180 occurs when the device 110 receives training data, instead of a new SLU model, and trains the local SLU model instead of replacing it. For example, the device 10 may modify (1181) the local SLU. The remote system 120 may aggregate (1182) modified weights received from a plurality of devices, generate (1183) a new SLU model based on the aggregated weights, generate (1184) training data based on the new SLU model, and send (1185) the training data to the device 110. Using the training data, the device 110 may modify (1186) the local SLU model to improve the local SLU model based on the aggregated weights but without replacing the existing model that was trained based on interactions with the user 5.

While FIG. 11H illustrates that the remote system 120 generates a new SLU model and then generates training data based on the new SLU model, the disclosure is not limited thereto. Instead, in some examples the remote system 120 may generate the training data directly from the aggregate modified weights without generating the new SLU model without departing from the disclosure. Additionally or alternatively, while FIGS. 11A-11H illustrate multiple examples of updating the local SLU model, the disclosure is not limited thereto and the device 110 may modify the local SLU model using any techniques known to one of skill in the art.

Figure 12:
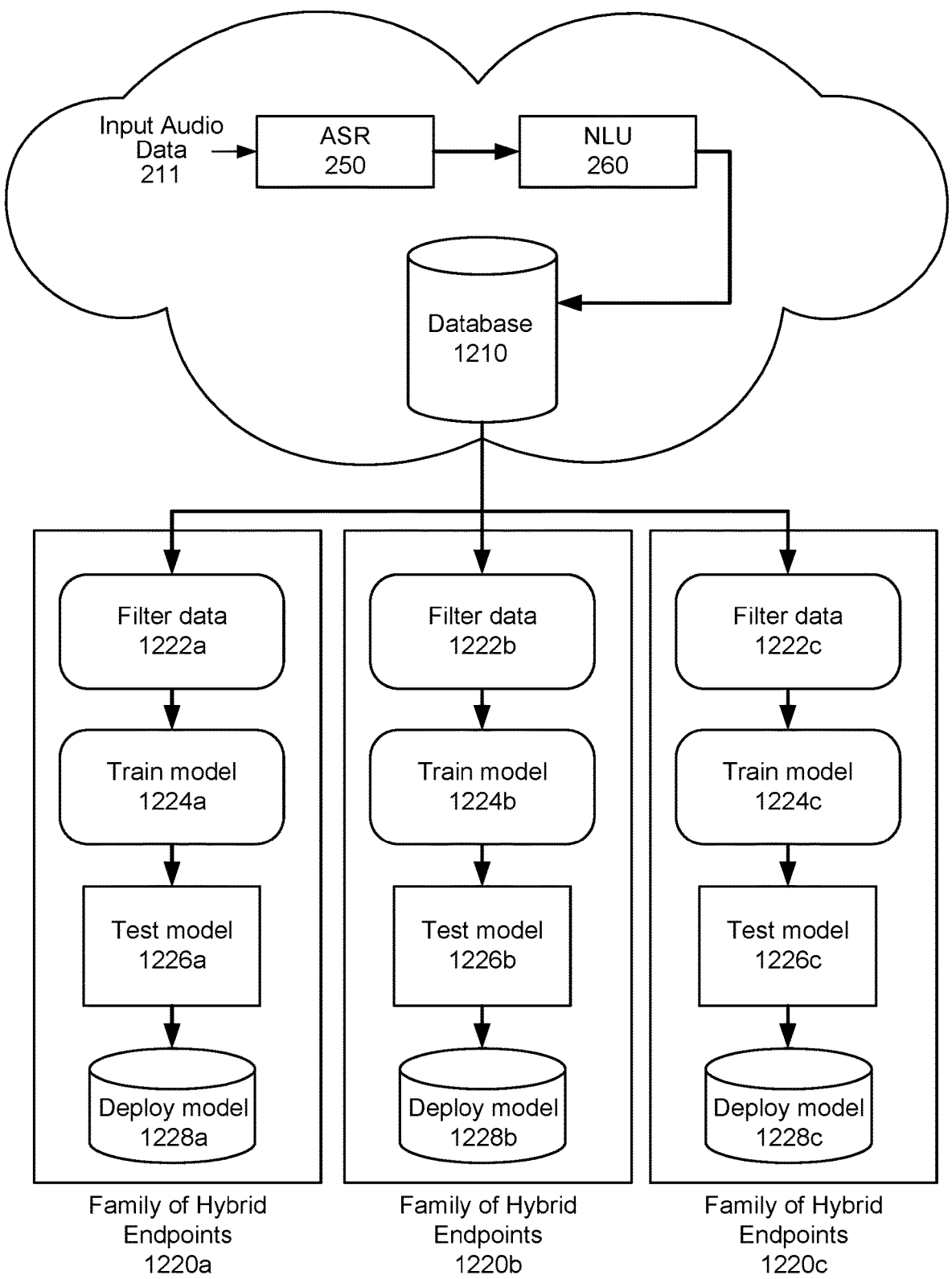
FIG. 12 illustrates an example of aggregating data from multiple devices and modifying an SLU model for individual families of devices according to embodiments of the present disclosure.

FIG. 12 illustrates an example of aggregating data from multiple devices and modifying an SLU model for individual families of devices according to embodiments of the present disclosure. As illustrated in FIG. 12, the remote system 120 may specifically filter the aggregate weights for each family of hybrid endpoints 1220, resulting in a customized SLU model for each family of the family of hybrid endpoints 1220.

To illustrate an example, input audio data 211 may be processed by an ASR component 250 to generate ASR data, which may be processed by an NLU component 260 to generate NLU data, which may be stored in a database 1210. For each family of hybrid endpoints 1220, the system 100 may filter data 1222, train a model 1224, test a model 1226, and deploy the model 1228. For example, for a first family of hybrid endpoints 1220*a*, the system may filter data 1222*a* to generate test data associated with the family of hybrid endpoints 1220*a*, train the model 1224*a* based on the filtered test data, test the model 1226*a*, and deploy the model 1228*a*.

The system 100 may perform the same steps for each family of hybrid endpoints 1220, filtering the test data based on specific capabilities and/or actions that are associated with the family of hybrid endpoints 1220. For example, in-car devices may support different domains/features than in-house devices, or a particular family of hybrid endpoints may be configured to perform only low-level commands or a limited number of commands (e.g., only configured to control a limited number of smart switches or smart lightbulbs, for example).

While not illustrated in FIG. 12, the database 1210 may also store the modified weights generated by each individual device 110. For example, the device 110 may send the modified weights to the remote system 120 and the modified weights may be stored in the database 1210 with identifying information. Thus, when the system 100 filters the data in step 1222, the system 100 may be selecting a subset of the modified weights based on whether the modified weights are relevant to the family of hybrid endpoints 1220. In some examples, the system 100 may filter the data based on whether the corresponding device is related to the family of hybrid endpoints 1220. Thus, the system 100 may filter the data to only include test data and/or modified weights associated with devices that are similar to the family of hybrid endpoints 1220.

Figure 13:
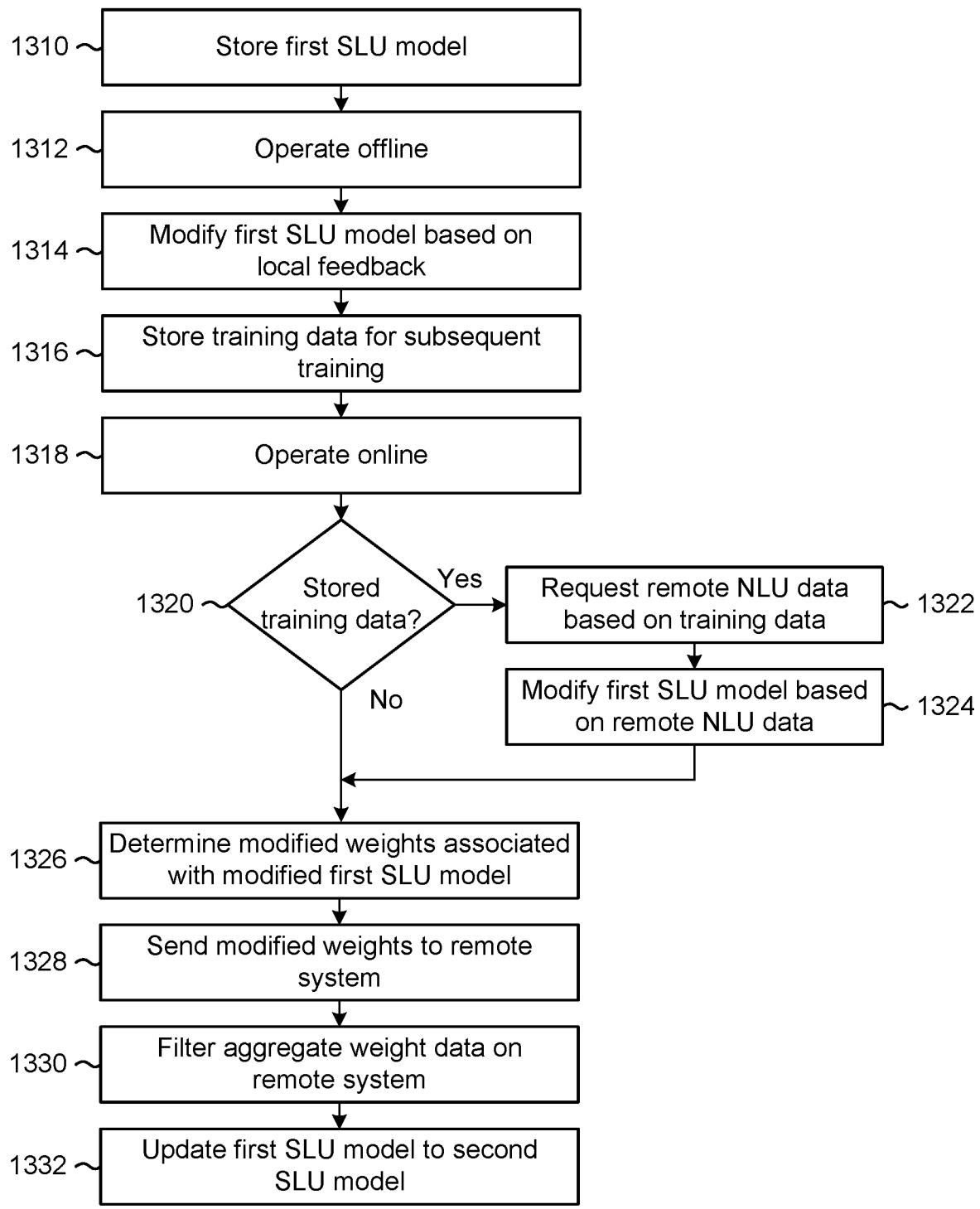
FIG. 13 is a flowchart conceptually illustrating an example method for asynchronously training an SLU model according to embodiments of the present disclosure.

FIG. 13 is a flowchart conceptually illustrating an example method for asynchronously training an SLU model according to embodiments of the present disclosure. As illustrated in FIG. 13, the device 110 may store (1310) a first SLU model and operate (1312) offline. For example, the device 110 may not be in communication with the remote system 120 while operating in the offline state.

While the device 110 is not in communication with the remote system 120 and therefore cannot compare the local NLU data to the remote NLU data, the device 110 may still modify (1314) the first SLU model based on local feedback, as described in greater detail below. For example, the device 110 may modify the first SLU model based on user feedback, multi-turn interactions with the user 5, and/or using other techniques known to one of skill in the art. In addition to modifying the first SLU model based on local feedback, the device 110 may also store (1316) training data for subsequent training. For example, the device 110 may identify particular utterances or local NLU data to compare with remote NLU data at a later point in time and may store all relevant information as test data. Thus, when the device 110 is able to communicate with the remote system 120, the device 110 may perform subsequent training using the stored test data.

At a later point in time, the device 110 may operate (1318) online and be in communication with the remote system 120 again. The device 110 may determine (1320) whether the device 110 stored training data, and if so, may request (1322)

remote NLU data based on the training data and may modify (1324) the first SLU model based on the remote NLU data. Thus, the device 110 may perform subsequent training based on the stored test data, analyzing the previously determined local NLU data and the remote NLU data received from the remote system 120.

Additionally or alternatively, the device 110 may determine (1326) modified weights associated with the modified first SLU model and may send (1328) the modified weights to the remote system 120. For example, the device 110 may determine modified weights indicating changes between the original first SLU model stored in step 1310 and the modified first SLU model, which was modified in step 1314 using local feedback and/or in step 1324 using remote feedback. While not illustrated in FIG. 13, while operating online and in communication with the remote system 120, the device 110 may perform parallel processing and modify the first SLU model based on remote NLU data received from the remote system 120 without departing from the disclosure.

After sending the modified weights to the remote system 120, the device 110 may filter (1330) aggregate weight data on the remote system 120 and may update (1332) the first SLU model to a second SLU model. Filtering the aggregate weight data may correspond to filtering aggregate weight data based on a type of device, features/domains associated with the device, specific actions, and/or the like, as discussed above with regard to FIG. 12. In some examples, the device 110 may filter the aggregate weight data and/or specify filtering criteria to the remote system 120 and the remote system 120 may filter the aggregate weight data. However, the disclosure is not limited thereto and the device 110 may simply receive data from the remote system 120 without departing from the disclosure. For example, the remote system 120 may filter the aggregate weight data and send the filtered weight data, training data to update the first SLU model to the second SLU model, weights associated with the second SLU model, the second SLU model, and/or the like without departing from the disclosure.

As discussed above with regard to FIGS. 11A-11H, the device 110 may update the first SLU model to the second SLU model using a variety of techniques. In some examples, such as the example illustrated in FIG. 11A, the remote system 120 may send the second SLU model to the device 110 and the device 110 may replace the first SLU model with the second SLU model. Similarly, in other examples such as the example illustrated in FIG. 11B, the remote system 120 may send modified weights associated with the second SLU model and the device 110 may replace the weights of the first SLU model with the modified weights associated with the second SLU model. In the abovementioned examples, the device 110 completely replaces the local SLU model (e.g., modified first SLU model) with the second SLU model received from the remote system 120, although the disclosure is not limited thereto.

In some examples, the device 110 may update the first SLU model to the second SLU model while retaining some of the training previously performed to the first SLU model. Thus, in some examples, such as the example illustrated in FIG. 11G, the device 110 may receive the second SLU model, weights associated with the second SLU model, and/or the like and may update the first SLU model to the second SLU model based on this information. Additionally or alternatively, the device 110 may modify the second SLU model received from the remote system 120 and/or the weights associated with the second SLU model with the modified weights associated with the modified first SLU model, thus retaining the previous training to the first SLU model within the framework of the second SLU model.

In other examples, such as the example illustrated in FIG. 11H, the device 110 may receive test data and/or training data associated with the filtered aggregate weight data and may update the first SLU model to the second SLU model based on this test data and/or training data. For example, the remote system 120 may identify certain training data to improve the first SLU model based on the filtered aggregate weight data and the device 110 may update the existing first SLU model to the second SLU model with the training data, without losing the previous training to the first SLU model.

Figure 14:
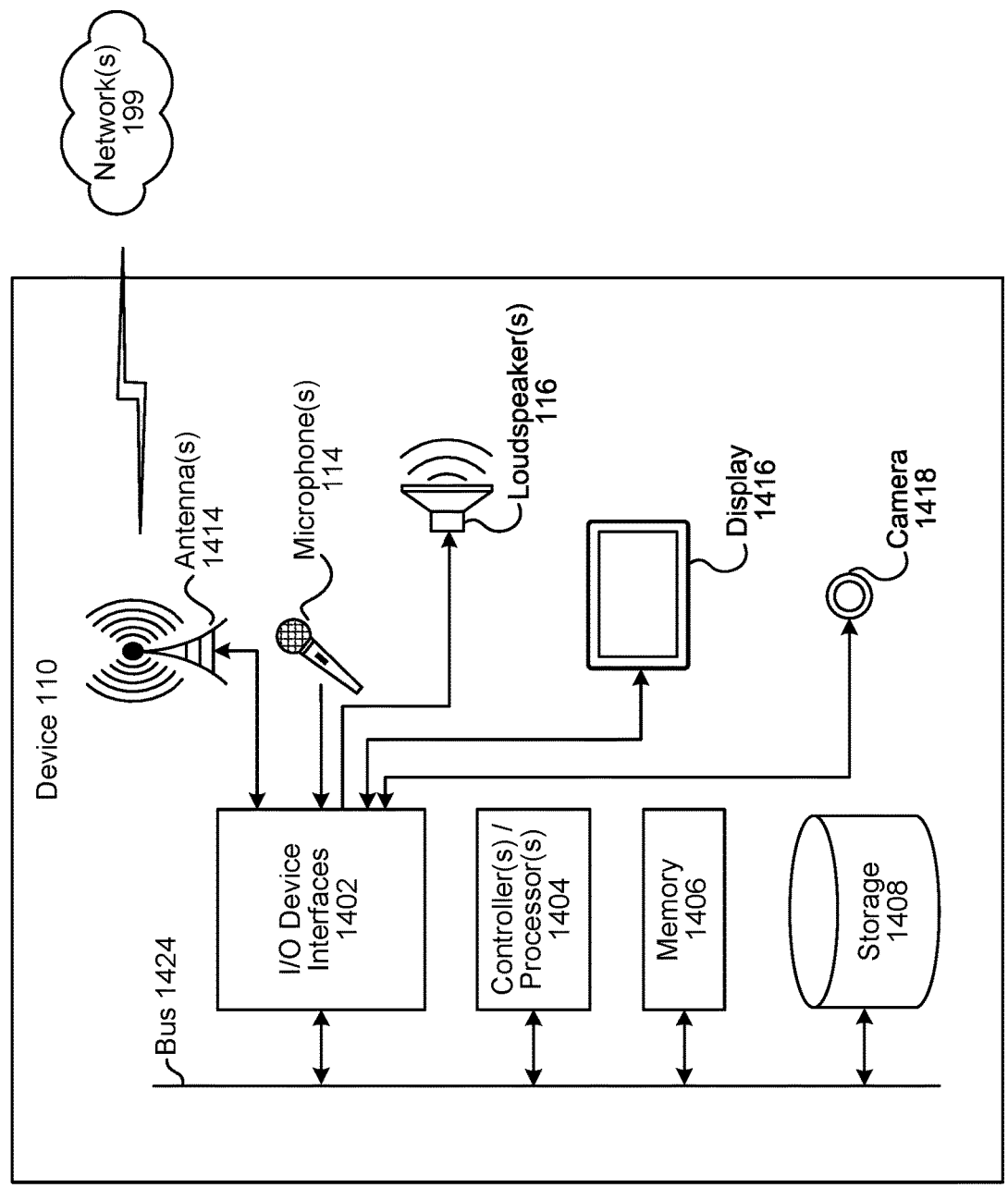
FIG. 14 is a block diagram conceptually illustrating example components of a device according to embodiments of the present disclosure.
Figure 15:
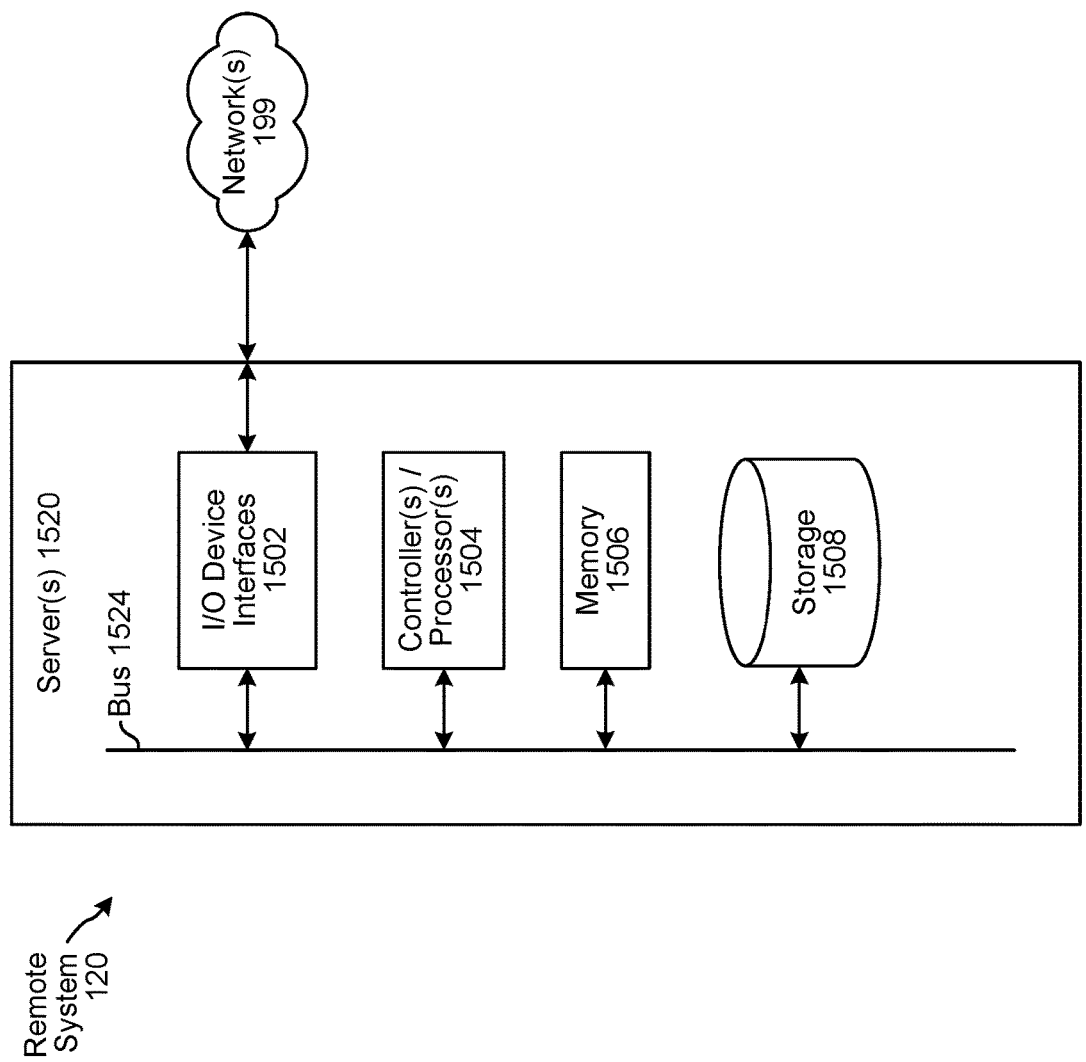
FIG. 15 is a block diagram conceptually illustrating example components of a server according to embodiments of the present disclosure.

FIG. 14 is a block diagram conceptually illustrating a user device 110 that may be used with the system. FIG. 15 is a block diagram conceptually illustrating example components of a remote device, such as remote server(s) 1520 included in the remote system 120, which may assist with ASR processing, NLU processing, SLU processing and/or command processing. Multiple remote servers 1520 may be included in the remote system 120, such as one or more servers for performing ASR, one or more remote servers 1520 for performing NLU, etc. In operation, each of these devices (or groups of devices) may include computer-readable and computer-executable instructions that reside on the respective device (110/1520), as will be discussed further below. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/1520) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/1520) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/1520) may also be connected to removable or external non-volatile memory and/or storage (such as a removable memory card, memory key drive, networked storage, etc.) through respective input/output device interfaces (1402/1502).

Computer instructions for operating each device (110/1520) and its various components may be executed by the respective device's controller(s)/processor(s) (1404/1504), using the memory (1406/1506) as temporary "working"

storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/1520) includes input/output device interfaces (1402/1502). A variety of components may be connected through the input/output device interfaces (1402/1502), as will be discussed further below. Additionally, each device (110/1520) may include an address/data bus (1424/1524) for conveying data among components of the respective device. Each component within a device (110/1520) may also be directly connected to other components in addition to (or instead of) being connected to other components across the bus (1424/1524).

Referring to FIG. 14, the device 110 may include input/output device interfaces 1402 that connect to a variety of components such as an audio output component such as loudspeaker(s) 116, a speaker (not illustrated), a wired headset or a wireless headset (not illustrated), or other component capable of outputting audio. The device 110 may also include an audio capture component. The audio capture component may be, for example, one or more microphone(s) 114 or an array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content and/or a camera 1418 for generating image data, although the disclosure is not limited thereto.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1402/1502) may also include communication components that allow data to be exchanged between devices such as different physical servers in a collection of servers or other components.

The components of the device(s) 110 and the remote system 120 may include their own dedicated processors, memory, and/or storage. Alternatively, one or more of the components of the device(s) 110 and the remote system 120 may utilize the I/O interfaces (1402/1502), processor(s) (1404/1504), memory (1406/1506), and/or storage (1408/1508) of the device(s) 110 and remote system 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the remote system 120, as described herein, are exemplary, and may be located as a stand-alone device or may be included, in whole or in part, as a component of a larger device or system.

Figure 16:
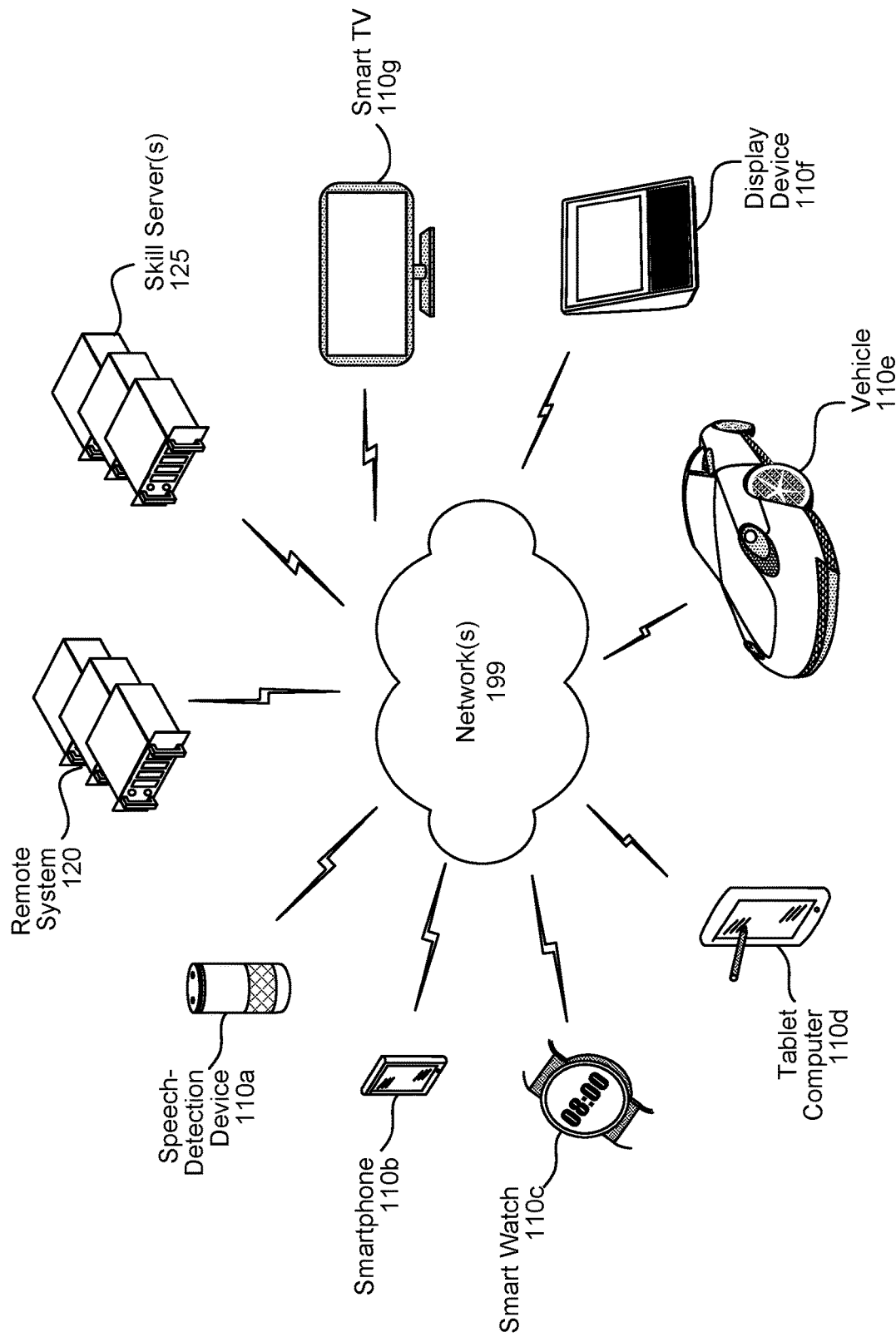
FIG. 16 illustrates an example of a computer network for use with the speech processing system.

As illustrated in FIG. 16, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smartphone 110b, a smart watch 110c, a tablet computer 110d, a vehicle 110e, a speech-detection and display device 110f, and/or a smart TV 110g may be connected to the network(s) 199 through a wireless service provider, over a WiFi or cellular network connection, or the like. Other devices are included as network-connected support devices, such as the remote system 120, skill server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more remote servers 1520.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   determining, by a first device, audio data representing an utterance;
   performing, by the first device, speech processing based on the audio data using a first model to determine output data;
   generating a second model configured to be used during speech processing;
   generating first data representing at least one difference between the first model and the second model;
   sending the first data to a remote system;
   receiving, by the first device and from the remote system, second data corresponding to a third model based at least in part on the first data;
   determining, by the first device, second audio data representing a second utterance; and
   performing, by the first device, speech processing based on the second audio data using the third model to determine second output data.

2. The computer-implemented method of claim 1, wherein the second data comprises weight data and the computer-implemented method further comprises, by the first device:
   processing the weight data with respect to at least one of the first model or the second model to generate the third model.

3. The computer-implemented method of claim 1, wherein the second data comprises training data and the computer-implemented method further comprises, by the first device:
   processing the training data with respect to at least one of the first model or the second model to generate the third model.

4. The computer-implemented method of claim 1, wherein:
   generating the first data comprises determining weight data representing the at least one difference between the first model and the second model; and
   sending the first data to the remote system comprises sending the weight data to the remote system.

5. A computer-implemented method comprising:
   determining, by a first device, audio data representing an utterance;
   performing, by the first device, speech processing based on the audio data using a first model to determine output data;
   generating a second model configured to be used during speech processing;
   determining a first difference value between a first weight value associated with the first model and a second weight value associated with the second model;
   determining a second difference value between a third weight value associated with the first model and a fourth weight value associated with the second model;
   determining that the first difference value is above a threshold value;
   determining that the second difference value is below the threshold value;
   generating first data representing at least one difference between the first model and the second model, the first data including the first difference value, but not the second difference value; and
   sending the first data to a remote system.

6. The computer-implemented method of claim 1, further comprising:
   sending, by the first device to a different device, the audio data; and
   receiving, by the first device from the different device, second output data,
   wherein generating the second model is based at least in part on the second output data.

7. The computer-implemented method of claim 6, further comprising:
   determining second data representing at least one difference between the output data and the second output data,
   wherein generating the second model is based at least in part on the second data.

8. The computer-implemented method of claim 1, further comprising, prior to determining the audio data:
   receiving, by the first device and from the remote system, the first model.

9. The computer-implemented method of claim 1, further comprising:
   during generating the second model, detecting a second utterance;
   halting generation of the second model;
   performing speech processing with regard to the second utterance; and
   following the speech processing with regard to the second utterance, resuming generation of the second model.

10. A system comprising:
    at least one processor; and
    at least one memory comprising instructions that, when executed by the at least one processor, cause the system to:
    determine, by a first device, audio data representing an utterance;
    perform, by the first device, speech processing based on the audio data using a first model to determine first output data;
    send, by the first device to a different device, the audio data;
    receive, by the first device and from the different device, second output data;
    determine first data representing at least one difference between the first output data and the second output data;

generate, based at least in part on the first data, a second model configured to be used during speech processing;

generate second first data representing at least one difference between the first model and the second model; and send the second data to a remote system.

11. The system of claim 10, wherein the at least one memory further comprises instructions that, when executed by the at least one processor, further cause the system to:

receive, by the first device and from the remote system, third data corresponding to a third model based at least in part on the second data;

determine, by the first device, second audio data representing a second utterance; and perform, by the first device, speech processing based on the second audio data using the third model to determine third output data.

12. The system of claim 11, wherein the third data comprises weight data and wherein the at least one memory further comprises instructions that, when executed by the at least one processor, further cause the first device to:

process the weight data with respect to at least one of the first model or the second model to generate the third model.

13. The system of claim 11, wherein the third data comprises training data and wherein the at least one memory further comprises instructions that, when executed by the at least one processor, further cause the first device to:

process the training data with respect to at least one of the first model or the second model to generate the third model.

14. The system of claim 10, wherein the at least one memory further comprises instructions that, when executed by the at least one processor, further cause the system to:

generate the second data at least in part by determining weight data representing the at least one difference between the first model and the second model; and send of the second data to the remote system at least in part by sending the weight data to the remote system.

15. The system of claim 10, wherein the at least one memory further comprises instructions that, when executed by the at least one processor, further cause the system to:

determine a first difference value between a first weight value associated with the first model and a second weight value associated with the second model;

determine a second difference value between a third weight value associated with the first model and a fourth weight value associated with the second model;

determine that the first difference value is above a threshold value;

determine that the second difference value is below the threshold value; and generate the second data at least in part by including the first difference value, but not the second difference value, in the second data.

16. The system of claim 10, wherein the at least one memory further comprises instructions that, when executed by the at least one processor, further cause the system to, prior to determination of the audio data:

receive, by the first device and from the remote system, the first model.

17. The system of claim 10, wherein the at least one memory further comprises instructions that, when executed by the at least one processor, further cause the system to:

during generation of the second model, detect a second utterance;

halt generation of the second model;

perform speech processing with regard to the second utterance; and following the speech processing with regard to the second utterance, resume generation of the second model.

18. The computer-implemented method of claim 5, wherein:

generating the first data comprises determining weight data representing the at least one difference between the first model and the second model; and sending the first data to the remote system comprises sending the weight data to the remote system.

19. The computer-implemented method of claim 5, further comprising, prior to determining the audio data:

receiving, by the first device and from the remote system, the first model.

20. The computer-implemented method of claim 5, further comprising:

during generating the second model, detecting a second utterance;

halting generation of the second model;

performing speech processing with regard to the second utterance; and following the speech processing with regard to the second utterance, resuming generation of the second model.

* * * * *